(12) United States Patent
Kimener

(10) Patent No.: US 12,017,709 B2
(45) Date of Patent: Jun. 25, 2024

(54) PORTABLE TRAILER STABILIZERS

(71) Applicant: Stabilock LLC, Loveland, OH (US)

(72) Inventor: Thomas T. Kimener, Loveland, OH (US)

(73) Assignee: Stabilock LLC, Loveland, OH (US)

( * ) Notice: Subject to any disclaimer, the term of this patent is extended or adjusted under 35 U.S.C. 154(b) by 0 days.

(21) Appl. No.: 18/319,923

(22) Filed: May 18, 2023

(65) Prior Publication Data

US 2023/0286600 A1 Sep. 14, 2023

Related U.S. Application Data

(63) Continuation-in-part of application No. 17/742,746, filed on May 12, 2022.

(60) Provisional application No. 63/303,393, filed on Jan. 26, 2022, provisional application No. 63/188,482, filed on May 14, 2021.

(51) Int. Cl.
*B62D 53/08* (2006.01)

(52) U.S. Cl.
CPC ................. *B62D 53/0871* (2013.01)

(58) Field of Classification Search
CPC ............ B62D 53/0864; B62D 53/0871; B62D 49/007; B62D 49/02; B60D 1/015; B60D 1/665; B60S 9/20; B60S 9/22
See application file for complete search history.

(56) References Cited

U.S. PATENT DOCUMENTS

| | | | | | |
|---|---|---|---|---|---|
| 2,637,453 | A | * | 5/1953 | Cleveland | B62D 53/06 414/241 |
| 3,746,369 | A | * | 7/1973 | Neff | B62D 53/0864 280/438.1 |
| 3,836,179 | A | * | 9/1974 | Jennings | B62D 53/0864 280/476.1 |
| 3,995,876 | A | * | 12/1976 | Ronne | B62D 53/0864 280/472 |
| 4,321,977 | A | * | 3/1982 | Tenn | B62D 49/007 414/458 |

(Continued)

*Primary Examiner* — Kevin Hurley
*Assistant Examiner* — Hosam Shabara
(74) *Attorney, Agent, or Firm* — Dorton & Willis LLP; Ryan Willis

(57) ABSTRACT

A method of stabilizing a parked semi-trailer, the method comprising: (i) repositioning a tractor, with a lift extending forward of a front of the tractor, the lift operatively coupled to a portable trailer stabilizer while at least a portion of the portable trailer stabilizer is elevated above the ground, forward to position the portable trailer stabilizer proximate a forward end of a semi-trailer that is parked; (ii) repositioning the tractor forward to reposition the portable trailer stabilizer at least partially beneath the forward end of the semi-trailer; (iii) repositioning the lift located at the front of the tractor in order to lower the portion of the portable trailer stabilizer to be in contact with the ground when proximate the forward end of the semi-trailer that is parked; (iv) operatively decoupling the portable trailer stabilizer from the lift after the portable trailer stabilizer is in contact with the ground; and, (v) reversing the tractor, after the lift is operatively decoupled from portable trailer stabilizer, to vacate a position in front of the forward end of the semi-trailer while parked.

21 Claims, 25 Drawing Sheets

(56) References Cited

U.S. PATENT DOCUMENTS

| | | | | |
|---|---|---|---|---|
| 4,537,137 A * | 8/1985 | White, Jr. | ............ | B62D 49/007 |
| | | | | 105/72.2 |
| 5,090,720 A * | 2/1992 | Heider | ............... | B62D 53/0821 |
| | | | | 280/438.1 |
| 5,139,102 A * | 8/1992 | Pocapalia | .......... | B62D 53/0864 |
| | | | | 180/19.2 |
| 5,246,081 A * | 9/1993 | Engle | ................ | B62D 53/0864 |
| | | | | 410/67 |
| 5,749,593 A * | 5/1998 | Phillips | ................. | B60D 1/465 |
| | | | | 280/411.1 |
| 6,663,131 B2 * | 12/2003 | Evans | .................... | B62D 53/08 |
| | | | | 280/438.1 |
| 7,270,201 B1 * | 9/2007 | Cryer | ................... | B62D 51/04 |
| | | | | 180/19.2 |
| 8,286,997 B2 * | 10/2012 | Kimener | ................... | B60S 9/04 |
| | | | | 280/475 |
| 8,528,929 B2 | 9/2013 | Kimener | | |
| 8,567,820 B2 | 10/2013 | Kimener et al. | | |
| 8,789,850 B2 | 7/2014 | Kimener et al. | | |
| 9,221,630 B2 | 12/2015 | Kimener et al. | | |
| 9,511,702 B2 * | 12/2016 | Ross | ........................ | B60P 3/40 |
| 9,611,109 B2 * | 4/2017 | Kimener | ............. | B65G 69/006 |
| 9,643,666 B2 * | 5/2017 | Andre | .................... | B65G 67/04 |
| 9,656,637 B2 | 5/2017 | Kimener | | |
| 9,694,790 B2 | 7/2017 | Kimener | | |
| 9,802,771 B2 | 10/2017 | Kimener et al. | | |
| 9,932,182 B2 | 4/2018 | Kimener et al. | | |
| 9,969,575 B2 * | 5/2018 | Kimener | ................... | B60S 9/12 |
| 10,308,450 B2 | 6/2019 | Kimener | | |
| 10,377,587 B2 | 8/2019 | Kimener | | |
| 10,399,800 B2 | 9/2019 | Kimener et al. | | |
| 10,407,031 B2 | 9/2019 | Kimener | | |
| 10,479,331 B2 | 11/2019 | Kimener | | |
| 10,507,993 B2 | 12/2019 | Kimener | | |
| 10,787,184 B2 * | 9/2020 | Banwart | ............. | B61D 47/005 |
| 10,829,321 B2 | 11/2020 | Kimener et al. | | |
| 11,034,200 B2 * | 6/2021 | Genheimer | ............. | B60D 1/62 |
| 11,180,330 B2 | 11/2021 | Kimener | | |
| 11,186,261 B2 | 11/2021 | Kimener | | |
| 11,317,554 B2 * | 5/2022 | Beaujot | .................. | B62D 63/062 |
| 11,319,172 B2 | 5/2022 | Kimener | | |
| 11,434,091 B2 | 9/2022 | Kimener et al. | | |
| 11,592,140 B2 | 2/2023 | Kimener et al. | | |
| 11,602,964 B2 * | 3/2023 | Wiegel | ................... | F16M 11/42 |
| 11,628,812 B2 | 4/2023 | Kimener | | |
| 11,648,996 B2 | 5/2023 | Kimener | | |
| 11,760,316 B2 | 9/2023 | Kimener | | |
| 2007/0040353 A1 * | 2/2007 | Dallaire | ................. | B60Q 1/305 |
| | | | | 280/476.1 |
| 2010/0025058 A1 * | 2/2010 | Carter | ................... | B62D 49/02 |
| | | | | 172/830 |
| 2020/0094790 A1 | 3/2020 | Kimener | | |
| 2022/0055849 A1 | 2/2022 | Kimener | | |
| 2022/0324664 A1 | 10/2022 | Kimener et al. | | |
| 2022/0363325 A1 | 11/2022 | Kimener | | |
| 2023/0242082 A1 | 8/2023 | Kimener | | |

\* cited by examiner

PORTABLE TRAILER STABILIZERS

CROSS REFERENCE TO RELATED APPLICATIONS

This application is a continuation of U.S. Nonprovisional patent application Ser. No. 17/742,746, filed May 12, 2022, and claims the benefit of U.S. Provisional Patent Application 63/303,393, filed Jan. 26, 2022, and U.S. Provisional Patent Application 63/188,482, filed May 14, 2021, the disclosures of each of which are incorporated by reference.

INTRODUCTION

The present disclosure is directed to supporting devices utilized to stabilize and/or support parked trailers and, more particularly, to portable trailer stabilizers that may be used, for example, with semi-trailers parked at loading docks while loading and/or unloading cargo, and related methods.

The present disclosure contemplates that distribution warehouses and facilities having semi-trailer loading/unloading capabilities (e.g., facilities with loading/unloading docks) are a necessary component of commerce in the twenty-first century. These warehouses may act as clearinghouses for shipments from various product suppliers and centralize the distribution of goods. Large chain retailers utilize warehouses to generate shipments to particular points of sale that are specific to the needs of consumers in that area, without requiring the original manufacturer of the goods to identify consumer demand at each point of sale and correspondingly deliver the particular goods to each point of sale.

The present disclosure contemplates that an example distribution warehouse (or similar facility) may include fifteen or more loading dock bays, with each loading dock bay adapted to receive a single freight trailer of a semi-truck. A loading dock door selectively closes off an opening of the loading dock bay elevated above ground level (e.g., a mezzanine) matching a height of the floor of the freight trailer. Alternatively, for liquid contents of a semi-trailer, a loading dock may comprise a horizontal or angled floor teamed with piping to allow egress of liquids to and from the semi-trailer. In the context of a warehouse, the relatively equal height between the floor of the loading dock and the floor of the trailer enables lift trucks (e.g., forklifts) and other material handling devices to move freely back and forth between the warehouse and interior of the freight trailer.

The present disclosure contemplates that in an example sequence, a loading dock bay at a warehouse or similar facility is initially unoccupied by a freight trailer. Thereafter, a semi-trailer driver or terminal tractor driver (or autonomous vehicle) backs a semi-trailer into alignment with the loading dock bay. In the context of a box semi-trailer, this includes backing the rear of the trailer to overlap with the loading dock door. After the semi-trailer is properly aligned and positioned adjacent to the loading dock door, engagement between the terminal truck and trailer will be continued or discontinued, where discontinuing allows the truck or autonomous vehicle to engage another trailer and/or relocate to a different location. As used herein, the term "terminal tractor" includes manned and autonomous vehicles utilized to engage and reposition semi-trailers. In the context of terminal tractors, a usual practice is to maintain engagement between such a vehicle and the freight trailer only long enough to position or reposition the freight trailer with respect to the loading dock bay. In an example day, a terminal tractor may connect to and disconnect from one hundred or more freight trailers.

The present disclosure contemplates that, in summary fashion, a terminal tractor (also known as a spotter truck or yard truck) is a dedicated tractor that stays at the dock facility and is only used to reposition freight trailers (e.g., not to tow the trailers on the open highways). By way of example, a facility may have ten loading dock bays, but may have fifty trailers waiting to be unloaded and/or unloaded. In order to expedite unloading and loading of contents with respect to each semi-trailer, as well as the convenience of the semi-truck drivers that deliver to or pick up the trailers from the facility, the trailers may need to be shuffled. This means that trailers do not include dedicated semi-tractors continuously connected to them. Instead, because no semi-tractor is connected to many, if not all, of the trailers at a facility, a terminal tractor may be used to shuffle the trailers at the facility.

The present disclosure contemplates that an exemplary process for engaging between the terminal tractor and the freight trailer includes backing the terminal tractor under a front end of the semi-trailer so a hydraulic fifth wheel of the terminal tractor engages a king pin of the semi-trailer, followed by initially raising the hydraulic fifth wheel to raise the front end of the trailer above its normal ride height. While the front end is raised, the landing gear of the freight trailer, which comprises a pair of equal length jacks permanently mounted to the trailer, are also elevated off the ground to allow repositioning of the trailer via its rear axle(s) engaged with the ground. The hydraulic fifth wheel allows the terminal tractor to reposition trailers without ever adjusting or otherwise repositioning the trailer's landing gear. As is customary, associated pneumatic and electrical connections between the terminal tractor and trailer are connected so that the brakes of the trailer are able to be unlocked. Conversely, to disengage the terminal tractor from the trailer, the hydraulic fifth wheel may be lowered so that lowering of the fifth wheel is operative to lower the front of the trailer and contact the ground with the landing gear. When the trailer is set down on its landing gear, the trailer is freestanding. After the trailer is freestanding, associated pneumatic and electrical connections between the terminal tractor and trailer are disconnected so that the brakes of the trailer are locked. Thereafter, the terminal tractor pulls out from under the front of the trailer, thereby leaving the trailer adjacent to the loading dock door and being supported at the front end using only the trailer's landing gear.

The present disclosure contemplates that when loading and unloading contents from a freestanding trailer, movement of the contents themselves and/or a lift truck along the floor of the trailer can impart considerable motion to the trailer. While some movement of the trailer is inevitable, considerable movement can result in the trailer becoming separated from the dock and/or possibly tipping over. More importantly, the landing gear of the trailer are generally not designed to hold up the weight of a fully loaded trailer, let alone the dynamic forces generated by contents and a lift truck moving through a trailer. In cases where these forces are great enough, the landing gear of the trailer can fail, leading the front end of the trailer to collapse or tip over. The obvious implications of a trailer collapsing or tipping over include damage to the goods within the trailer, the trailer itself, and the lift truck, not to mention the possible serious injury to or death of the lift truck operator.

While known devices have been used to support parked semi-trailers, there is a need in the industry for improved trailer stabilizers for use with parked semi-trailers. In addition, there is a need in the industry for a trailer stabilizer that utilizes a closed hydraulic system to potentially support the freight trailer. Moreover, there is a need in the industry for a trailer stabilizer that utilizes a closed hydraulic system that can be repositioned underneath a parked semi-trailer and operates to support the semi-trailer if the landing gear of the trailer fail. Further, there is a need in the industry to provide a trailer stabilizer that may be repositioned by engaging the front of a terminal tractor and deployed by the terminal tractor driving forward and toward a front of the semi-trailer, rather than backing the terminal tractor to reposition a trailer stabilizer. Still further, there is a need in the industry to provide a trailer stabilizer that can support the weight of a fully loaded front end of a semi-trailer, upon landing gear failure, that dampens the abrupt forces otherwise present from an undampened collision between the semi-trailer and a stabilizer.

DETAILED DESCRIPTION

Example embodiments according to the present disclosure are described and illustrated below to encompass devices, methods, and techniques relating to supports utilized to stabilize and/or support parked trailers, such as portable stabilizers and/or stabilizing systems that may be used, for example, with semi-trailers parked at loading docks while loading and/or unloading contents. Of course, it will be apparent to those of ordinary skill in the art that the embodiments discussed below are examples and may be reconfigured without departing from the scope and spirit of the present disclosure. It is also to be understood that variations of the example embodiments contemplated by one of ordinary skill in the art shall concurrently comprise part of the instant disclosure. However, for clarity and precision, the example embodiments as discussed below may include optional steps, methods, and features that one of ordinary skill should recognize as not being a requisite to fall within the scope of the present disclosure. Various example embodiments are described and, unless specifically excluded, any element, feature, aspect, or operation described in connection with any example embodiment may be utilized in any combination in connection with any other embodiment. Moreover, in the example embodiments described herein, unless specifically noted as being necessary or indispensable, any element, feature, aspect, or operation described in connection with any example embodiment or in any combination may be omitted in connection with that embodiment or any other embodiment or combination of embodiments.

Figure 1:
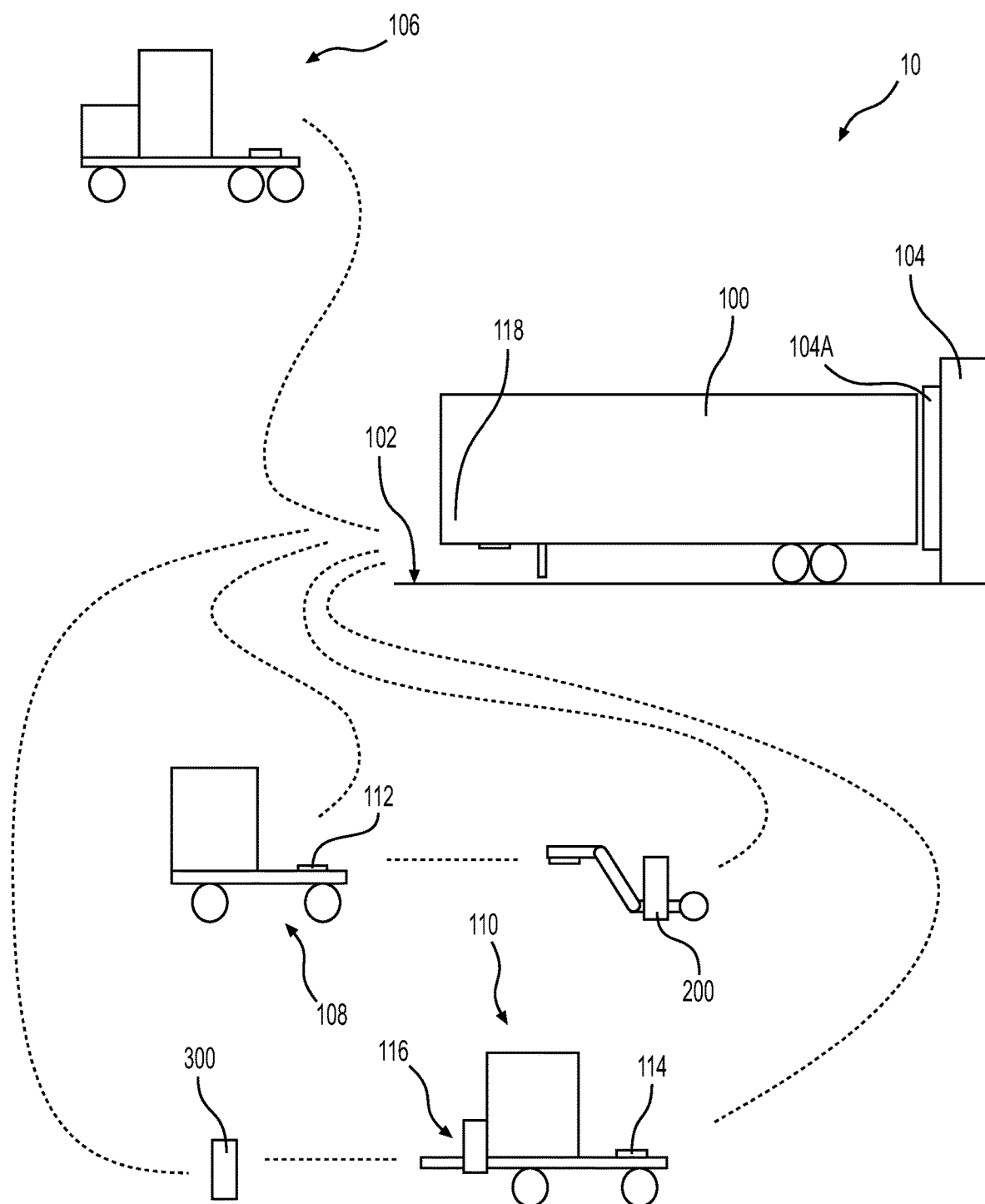
FIG. 1 is a simplified schematic view of an example portable trailer stabilizer system, according to at least some aspects of the present disclosure.

FIG. 1 depicts an example portable trailer stabilizer system 10 that may include and/or may be used in connection with one or more semi-trailers 100, which may be parked on a support surface 102, such as in a parking location proximate a building 104. For example, the building 104 may include a loading dock having one or more loading dock bays 104A, with each bay having a loading dock opening that may be selectively opened and closed by an overhead door. The trailer 100 may be transported relatively long distances by an over-the-road tractor 106 and/or the trailer may be transported relatively short distances by a terminal tractor 108, 110. When the trailer 100 is parked, a portable trailer stabilizer 200, 300 may be positioned proximate the trailer 100 and ready to stabilize and/or support at least a portion of the trailer 100. For example, the terminal tractor 108, 110 may be used to position the portable trailer stabilizer 200, 300 proximate a forward end portion 118 of the trailer 100, such as beneath the forward end portion 118 of the trailer 100 and between the trailer 100 and the support surface 102. Generally, as used herein, "tractor" may refer to a vehicle that is configured to pull, push, carry, and/or reposition another piece of equipment and includes over-the-road tractors 106, terminal tractors 108, 110, lift trucks, and/or other vehicles suitable for performing similar functions. For brevity, the following description focuses on tractors 106, 108, 110; however, it will be understood that other tractors may be utilized in similar manners in accordance with the instant disclosure.

In some example embodiments, a tractor such as the terminal tractor 108, 110 may be used to reposition the portable trailer stabilizer 200, 300 proximate the trailer 100. Some example portable trailer stabilizers 200 may be configured to be repositioned by towing (e.g., pulling and/or pushing) by a terminal tractor 108, 110 using the terminal tractor's fifth wheel 112, 114, which it may also use for repositioning trailers 100. Some example portable trailer stabilizers 300 may be configured to be repositioned by lifting and carrying by a terminal tractor 110 using a trailer stabilizer positioning element 116 separate from the terminal tractor's fifth wheel 114.

Figure 2:
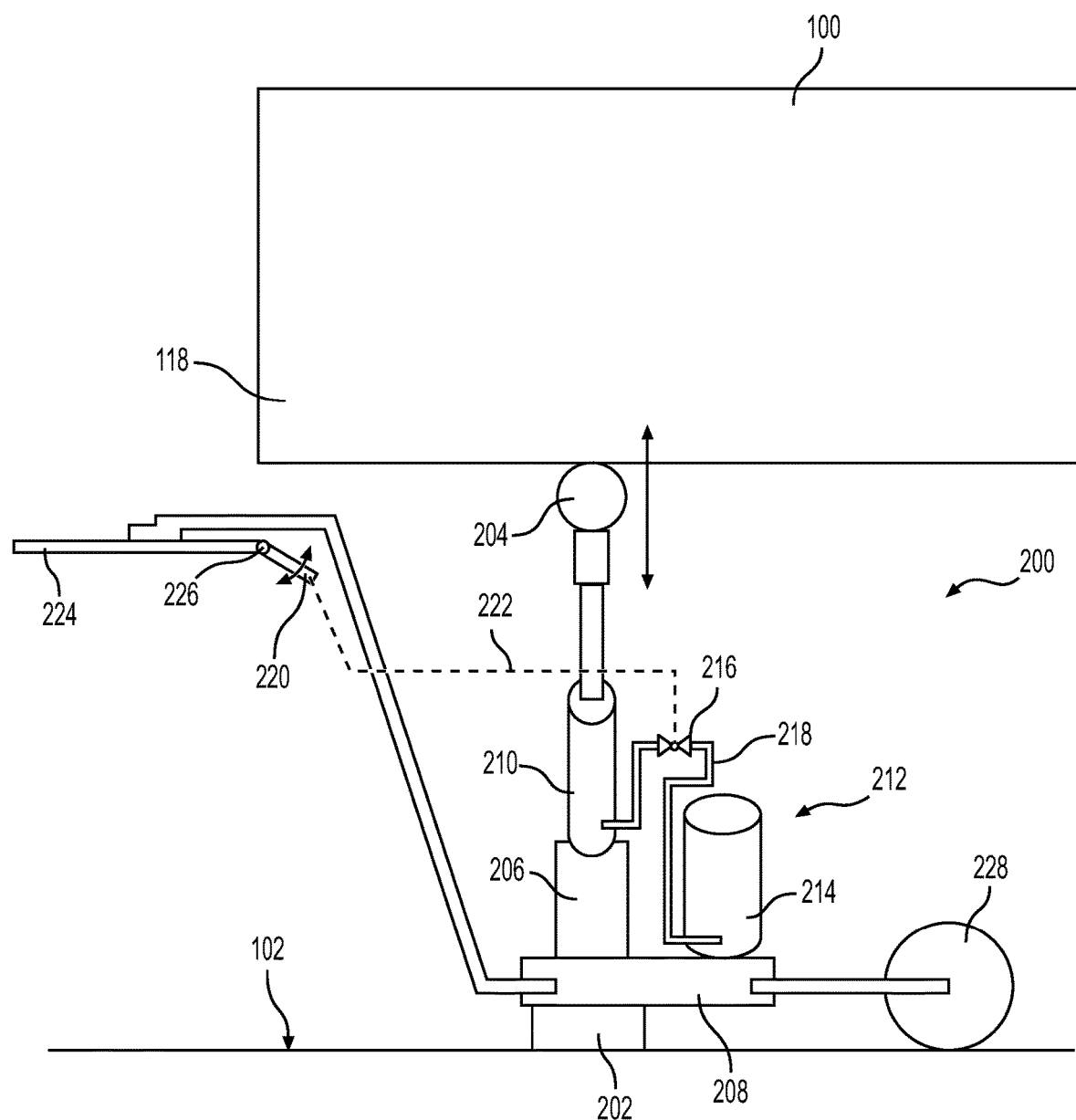
FIG. 2 is a schematic view of an example towable portable trailer stabilizer engaged with a trailer, according to at least some aspects of the present disclosure.

Turning to FIG. 2, the portable trailer stabilizer 200 may be configured to extend between the support surface 102 (e.g., ground) and the underside of the forward end portion 118 of the trailer 100, such as to stabilize and/or support the forward end portion 118 of the trailer 100. Alternatively, as discussed hereafter, the trailer stabilizer 200 may be positioned not to contact the trailer 100 unless the landing gear of the trailer fails or significantly sags, or the trailer frame bends under load. While FIG. 2 depicts the portable trailer stabilizer 200 as concurrently contacting the support surface 102 and the underside of the forward end portion 118, it is within the scope of the disclosure for there to be a gap between the portable trailer stabilizer 200 and at least one of the support surface 102 and the underside of the forward end portion 118 of the trailer 100.

The portable trailer stabilizer 200 may include a support surface engagement element, such as a ground pad 202, which may be configured to selectively engage the support surface 102. The portable trailer stabilizer 200 may include a trailer engagement element, such as a trailer engagement bar 204, which may be configured to selectively engage the trailer 100. The trailer engagement bar 204 may be arranged to extend generally horizontally and/or generally laterally (e.g., side-to-side) beneath the forward end portion 118 of the trailer 100. In some example embodiments, the trailer engagement bar 204 may be constructed from a section of metal channel or tube, such as round tube.

In some example embodiments, the support surface engagement element 202 and the trailer engagement element 204 may be operatively connected by one or more structural elements 206, 208 and/or one or more actuators, such as one or more hydraulic cylinders 210. In other example embodiments, alternative actuators may be used, such as pneumatic or electrical actuators, electromechanical jacks, and/or a spring lifting apparatus with a ratchet and pawl mechanism to vertically reposition the trailer engagement element 204 with respect to the support surface engagement element 202. The actuators 210 may be configured to facilitate vertical repositioning, such as extension and/or retraction, of the trailer engagement element 204 relative to the support surface engagement element 202. For example, when pressurized hydraulic fluid is directed to the hydraulic cylinder 210, the hydraulic cylinder 210 may extend to extend the trailer engagement element 204 relative to the support surface engagement element 202. As used herein, "pressurized" may refer to a pressure greater than ambient atmospheric pressure.

Figure 4:
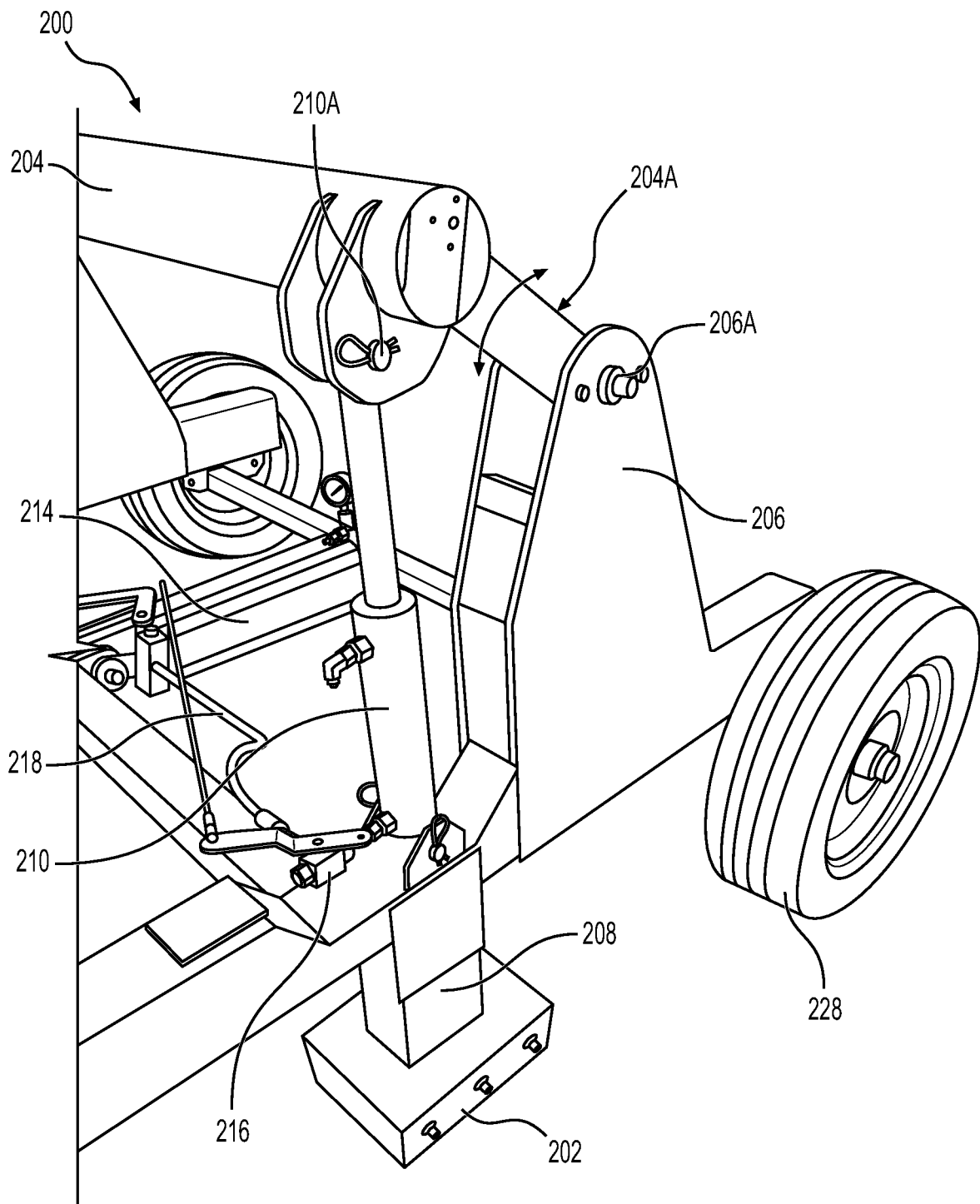
FIG. 4 is a partial profile elevated perspective view showing various aspects of the example portable trailer stabilizer of FIG. 3 according to at least some aspects of the present disclosure.
Figure 5:
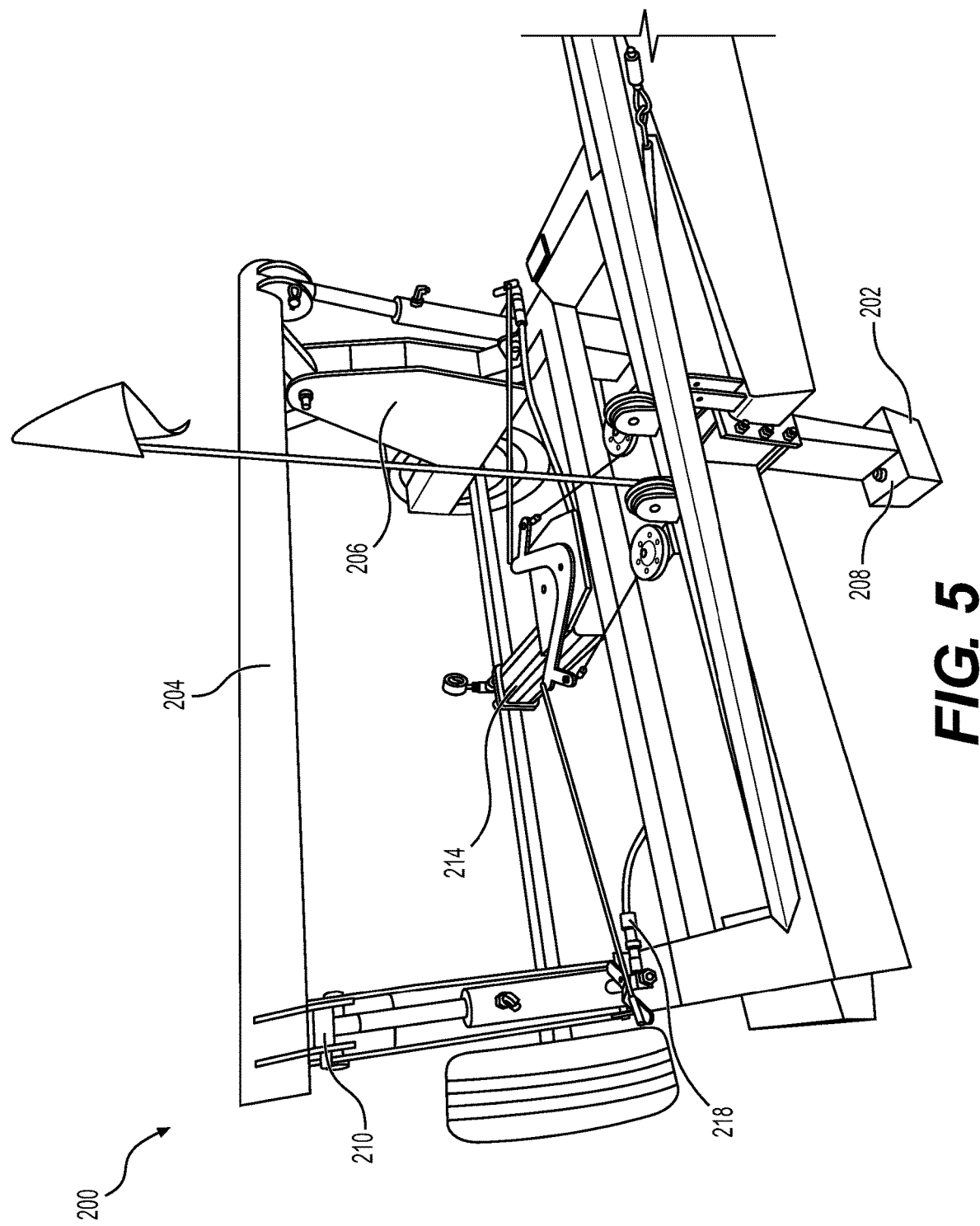
FIG. 5 is a partial front elevated perspective view showing various aspects of the example portable trailer stabilizer of FIG. 3 according to at least some aspects of the present disclosure.
Figure 6:
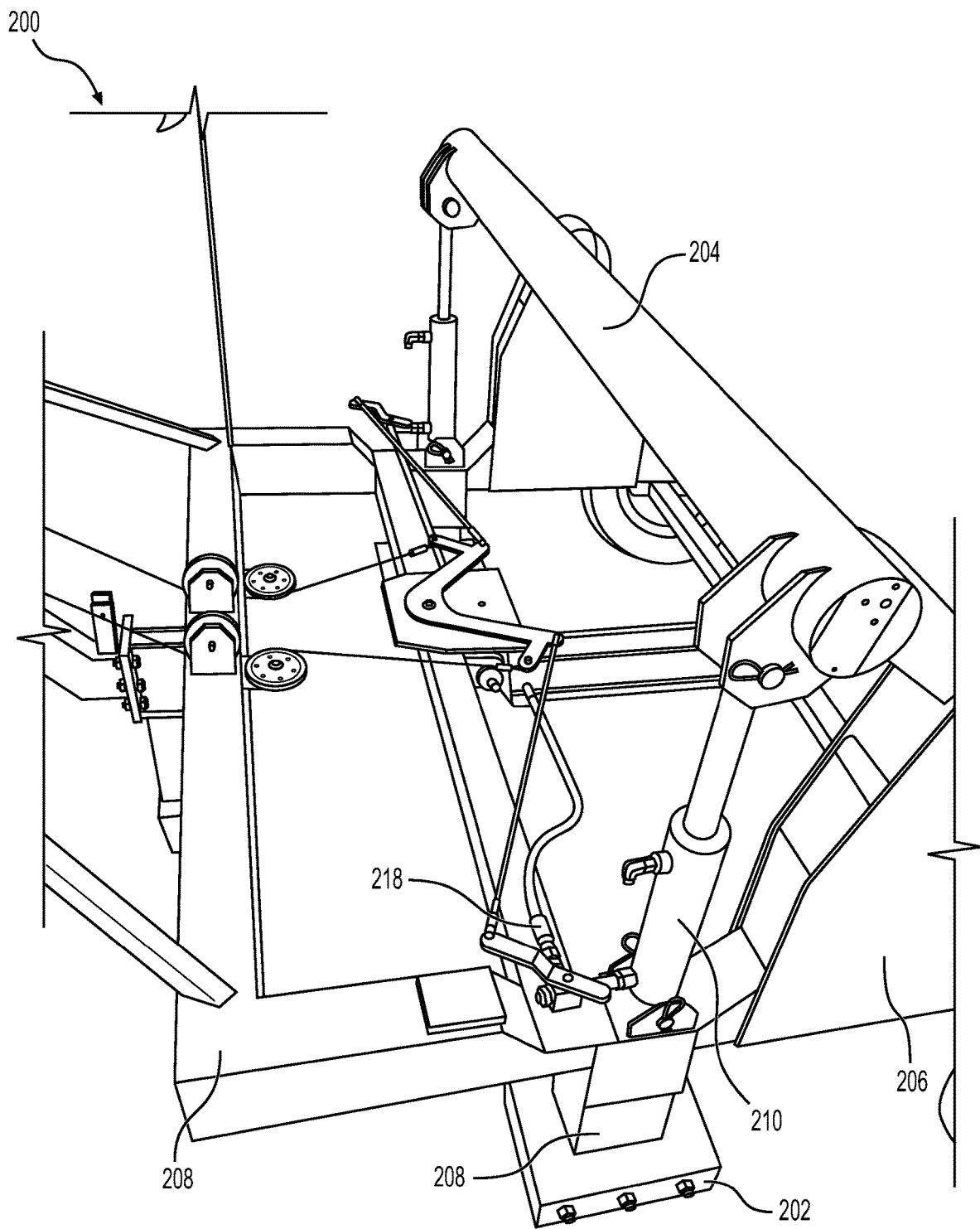
FIG. 6 is a narrowed partial profile elevated perspective view showing various aspects of the example portable trailer stabilizer of FIG. 3 according to at least some aspects of the present disclosure.
Figure 7:
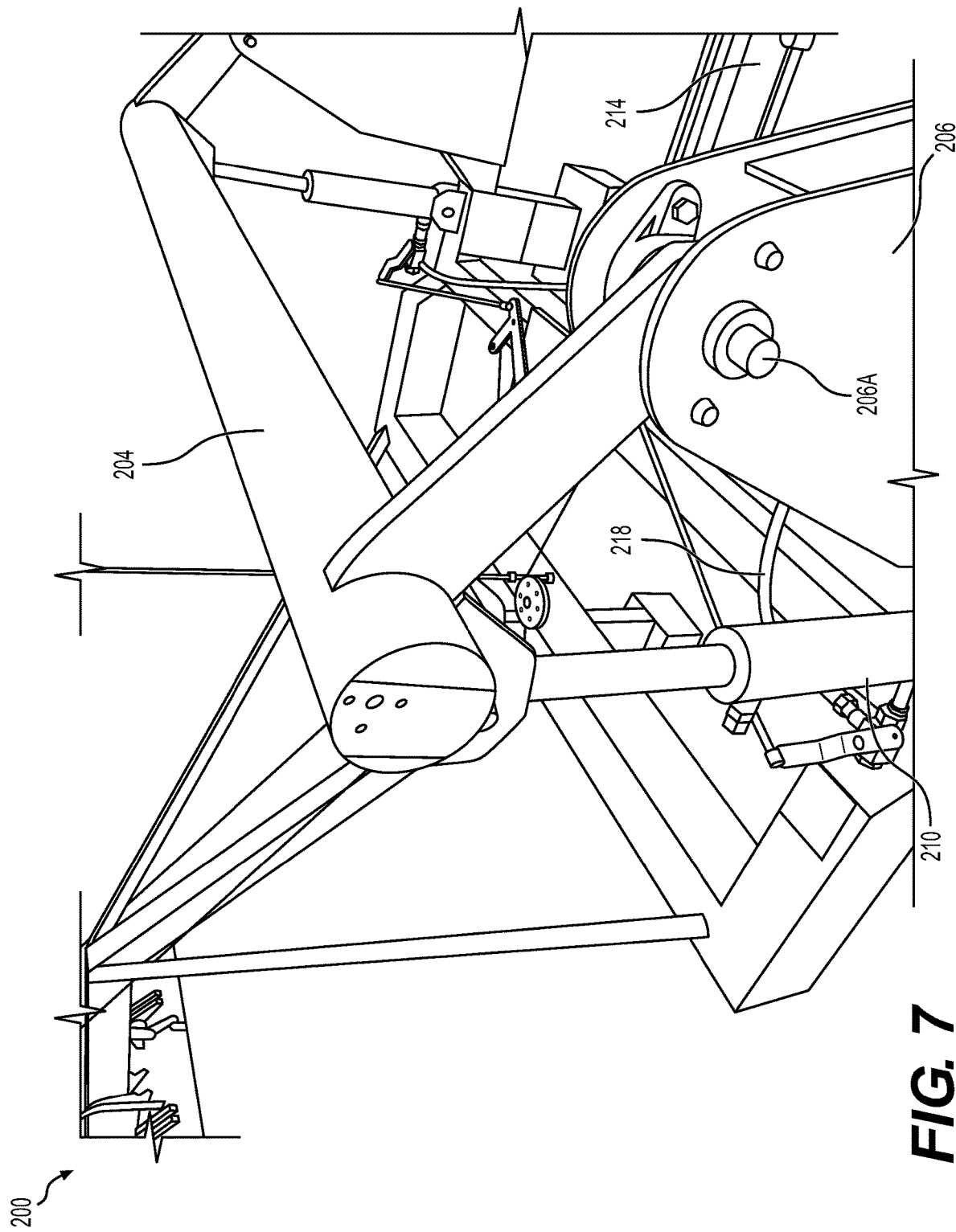
FIG. 7 is a narrowed partial rear profile elevated perspective view showing various aspects of the example portable trailer stabilizer of FIG. 3 according to at least some aspects of the present disclosure.

In some example embodiments, the trailer engagement element (e.g., trailer engagement bar 204) may be coupled to the structural elements 206, 208 and/or the actuators (e.g., hydraulic cylinders 210) by one or more pivot connections 210A (see FIG. 4). For example, some pivot connections may allow the trailer engagement bar 204 to tilt side-to-side with respect to the trailer. Accordingly, the portable trailer stabilizer 200 may accommodate uneven support surfaces 102, support surfaces 102 having debris thereon, and/or tilted semi-trailers 100, for example.

In some example embodiments, the actuator 210 may be powered by an on-board, self-contained energy source. For example, the hydraulic cylinder 210 may be operatively connected to an on-board, self-contained hydraulic system 212. As used herein, "on-board" may refer to a component or clarity, as used herein, an energy source may be "self-contained" even if it stores energy resulting from externally applied forces, provided that the application of the externally applied forces is incidental to operation of the portable trailer stabilizer.

In some example embodiments, the hydraulic system 212 may include one or more hydraulic accumulators 214, one or more isolation valves 216 (e.g., ball valves), one or more relief valves 217, and/or one or more hydraulic conduits 218 in selective fluid communication with the accumulator 214 and the cylinder(s) 210. The hydraulic system 212 may comprise a closed hydraulic system. As used herein, "closed hydraulic system" may refer to operatively connected hydraulic components that are configured for normal operation without supplying hydraulic fluid to and/or receiving hydraulic fluid from an external component. For example, the hydraulic system 212 may be configured so that hydraulic fluid flows between the accumulator 214 and the cylinder(s) 210 via the conduits 218 and valves 216, 217 without external connections (during normal use). As used herein, "closed hydraulic system" may include a hydraulic system that occasionally receives supplemental hydraulic fluid, such as to replace hydraulic fluid lost due to leakage.

In some alternative example embodiments, a hydraulic system may utilize an external pump (e.g., located on board the stabilizer 200, 300 and/or on a tractor), such as to raise and/or lower the trailer engagement element 204. Some example on board pumps may utilize a battery with a solar charger and/or may be configured for charging from an external charger or dedicated power supply such as a corded outlet. In some example embodiments, limit and/or pressure switches may limit the travel of the trailer engagement element 204.

In some example embodiments, the hydraulic fluid throughout the closed hydraulic system may be pressurized, such as at all times during normal operation. For example, some example closed hydraulic systems may not include a vented reservoir (e.g., at about atmospheric pressure). Although FIG. 2 schematically illustrates one hydraulic cylinder 210 coupled to one accumulator 214 via one isolation valve 216 for clarity, some example embodiments may include one or more (e.g., two) hydraulic cylinders 210, one or more accumulators 214, one or more relief valves 217, and/or one or more (e.g., two) isolation valves 216 (or other flow control devices) interconnected by any number of conduit 218 segments.

In some example embodiments, the isolation valve 216 may be operated (e.g., opened and/or shut) by an isolation valve operator mechanism, such as a valve operator element 220 and/or a cable 222 operatively connecting the valve operator element 220 to the isolation valve 216. In other example embodiments, isolation valve operator mechanisms may include mechanical linkages, electrical actuators, and/or hydraulic actuators arranged to open and/or shut the isolation valve 216.

In some example embodiments, the isolation valve operator mechanism (e.g., valve operator element 220) may be configured for operation in connection with coupling the portable trailer stabilizer 200 to a tractor 106, 108 and/or uncoupling the portable trailer stabilizer 200 from a tractor 106, 108. For example, the isolation valve operator mechanism may be configured so that it is actuated by the act of coupling the portable trailer stabilizer 200 to a tractor 106, 108 and/or the act of uncoupling the portable trailer stabilizer 200 from a tractor 106, 108 (e.g., without additional action by an operator). For example, the valve operator element 220 may comprise a valve operator plate coupled to a positioning element engagement element, such as a fifth wheel plate 224, via a pivot 226. In operation, the valve operator element 220 may be configured so that when a terminal tractor's trailer stabilizer positioning element, such as a fifth wheel 112, 114, engages or disengages the fifth wheel plate 224 of the portable trailer stabilizer 200, the valve operator element 220 is pivoted. Repositioning, such as by pivoting, the valve operator element 220 may operate (e.g., open and/or shut) the isolation valve 216 via the cable 222. For example, the isolation valve operator mechanism may be configured so that when the fifth wheel plate 224 of the portable trailer stabilizer 200 is disengaged from the terminal tractor's fifth wheel 112, 114, the isolation valve 216 may be shut and/or when the fifth wheel plate 224 of the portable trailer stabilizer 200 is engaged with the terminal tractor's fifth wheel 112, 114, the isolation valve 216 may be open. Some example embodiments may include one or more wheels 228 configured to support the portable trailer stabilizer 200 on the support surface 102 during repositioning. The wheels 228 may facilitate repositioning of the portable trailer stabilizer 200 by towing (e.g., pulling and/or pushing), such as when the portable trailer stabilizer's fifth wheel plate 224 is coupled to the terminal tractor's fifth wheel 112, 114.

Figure 3:
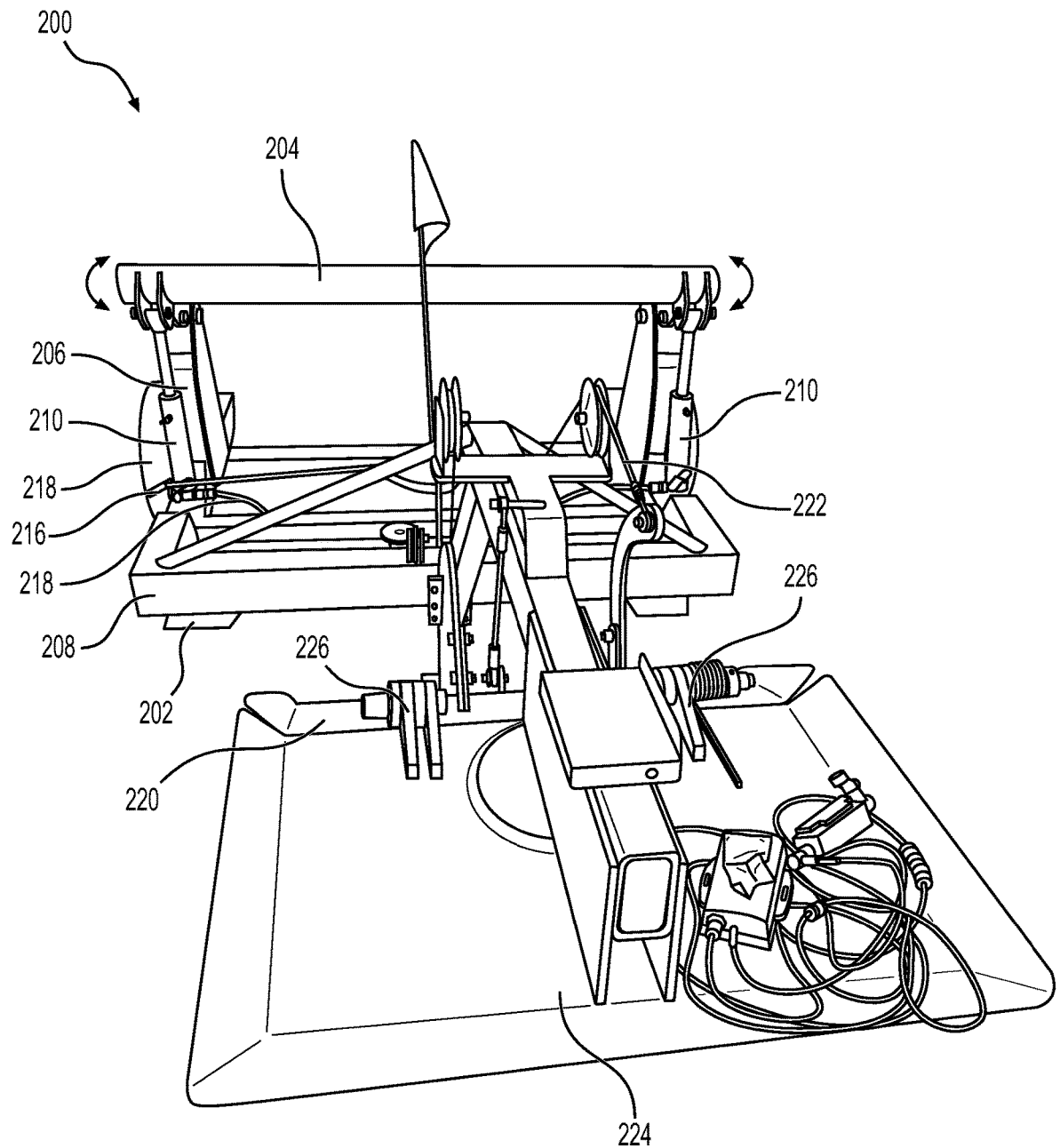
FIG. 3 is a front elevated perspective views showing various aspects of an example portable trailer stabilizer according to at least some aspects of the present disclosure.

Referring to FIGS. 3 and 4, in some example embodiments, the trailer engagement element 204 may be pivotably disposed with respect to one or more of the structural elements 206, 208. For example, the trailer engagement bar 204 may be coupled to the structural element 206 by a pivot 206A that may include a pivot pin, which may allow the trailer engagement bar 204 to move generally upward and downward (e.g., at a radius from the pivot 206A) while extending and/or compressing the hydraulic cylinder 210.

In some example embodiments, the trailer engagement element (e.g., trailer engagement bar 204) may comprise a sloped engagement surface 204A. The engagement surface 204A may be arranged to contact the forward end portion 118 of the trailer 100 when the portable trailer stabilizer 200 is positioned beneath the forward end portion 118. When the trailer engagement bar 204 is higher than the underside of the forward end portion 118 of the trailer 100, the engagement surface 204A may contact and slide beneath and along the forward end portion 118 underside as the portable trailer stabilizer 200 is moved underneath the forward end portion 118. Accordingly, contact between a forward edge and the underside of the trailer 100 and the engagement surface 204A and/or the trailer engagement bar 204 may press the trailer engagement bar 204 downward, thus compressing the hydraulic cylinder 210.

Figure 8:
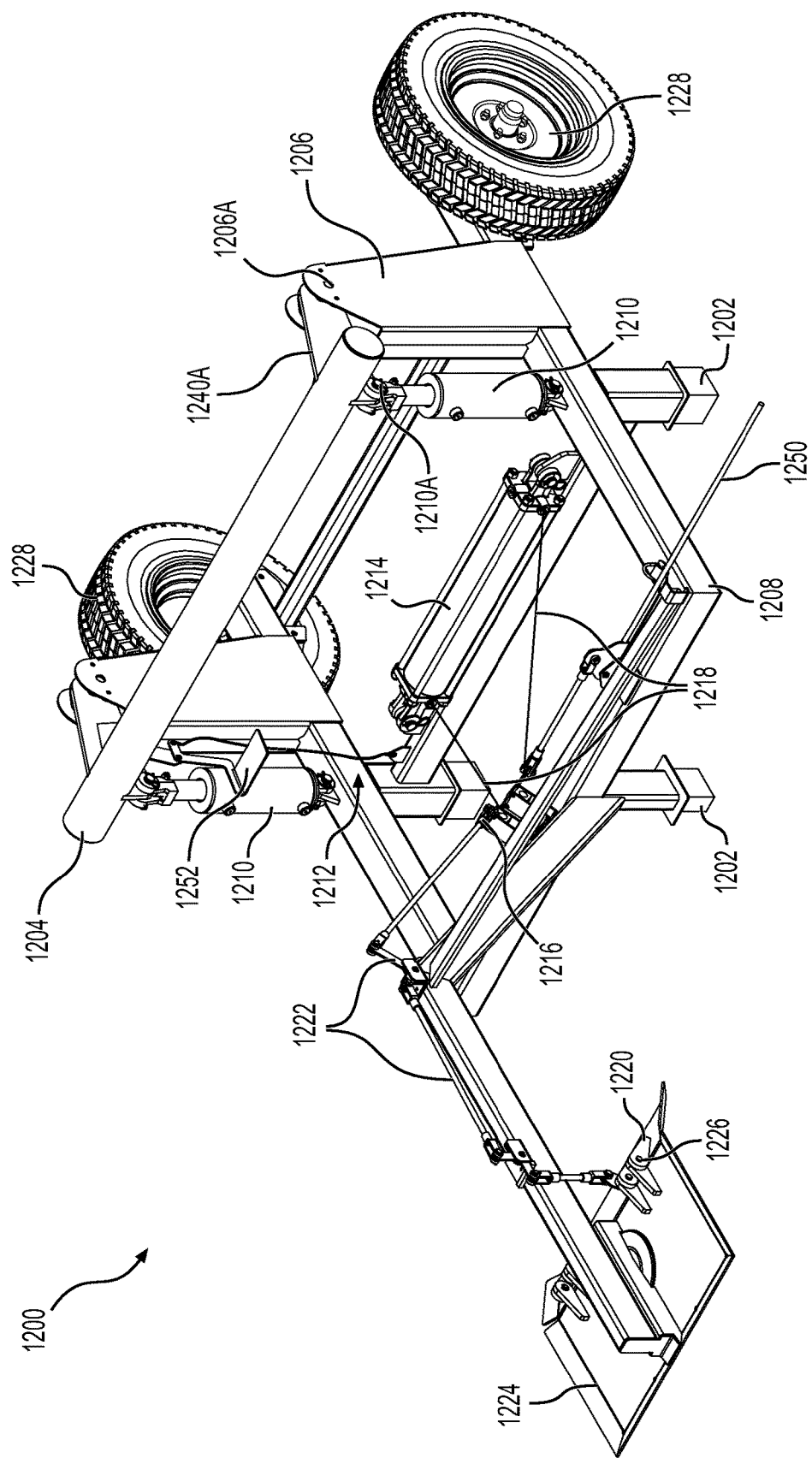
FIG. 8 is a front perspective view of a further example portable trailer stabilizer, depicted with signaling in the notification position according to at least some aspects of the present disclosure.
Figure 9:
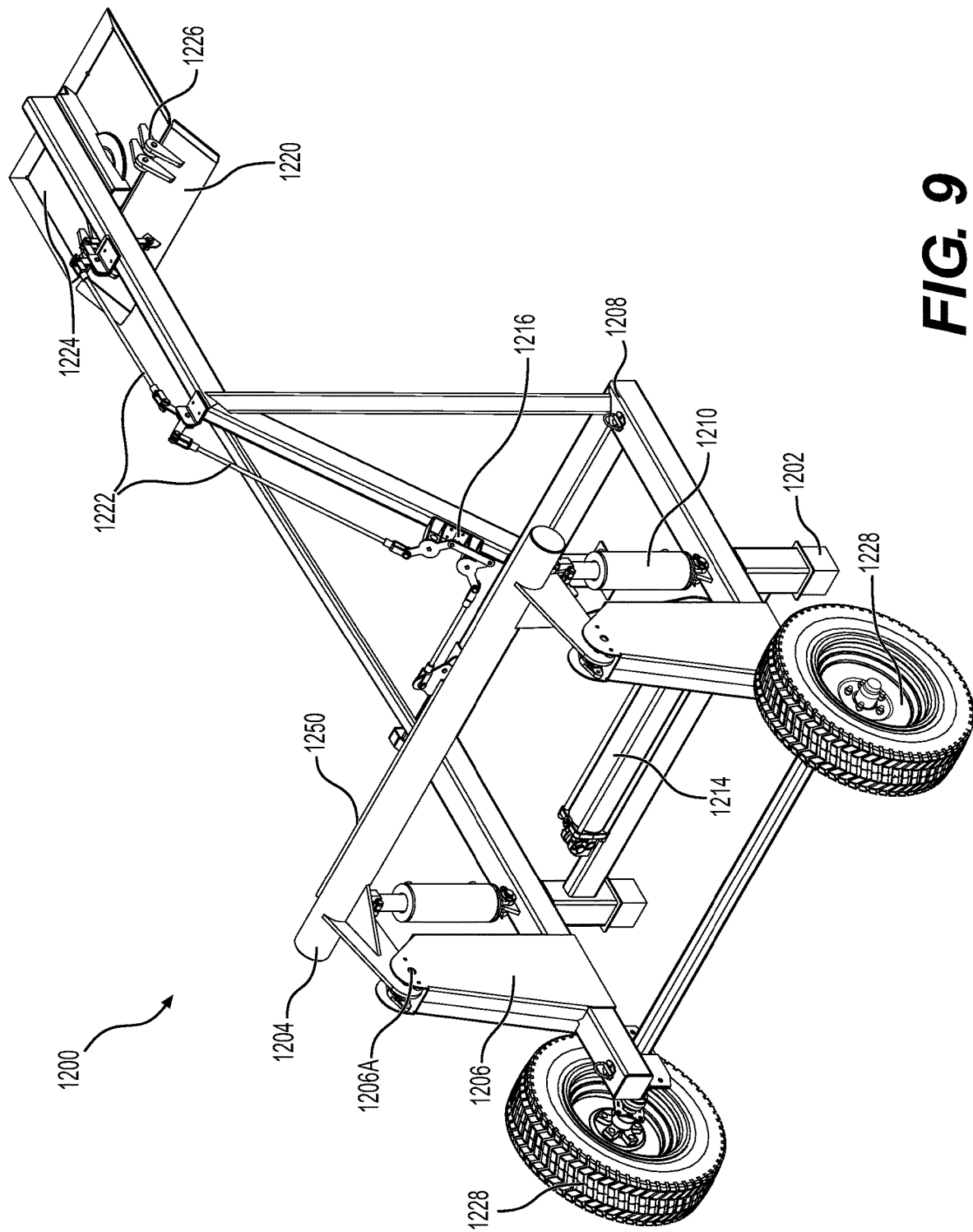
FIG. 9 is a rear perspective view of the portable trailer stabilizer of FIG. 8 with signaling in the notification position.
Figure 10:
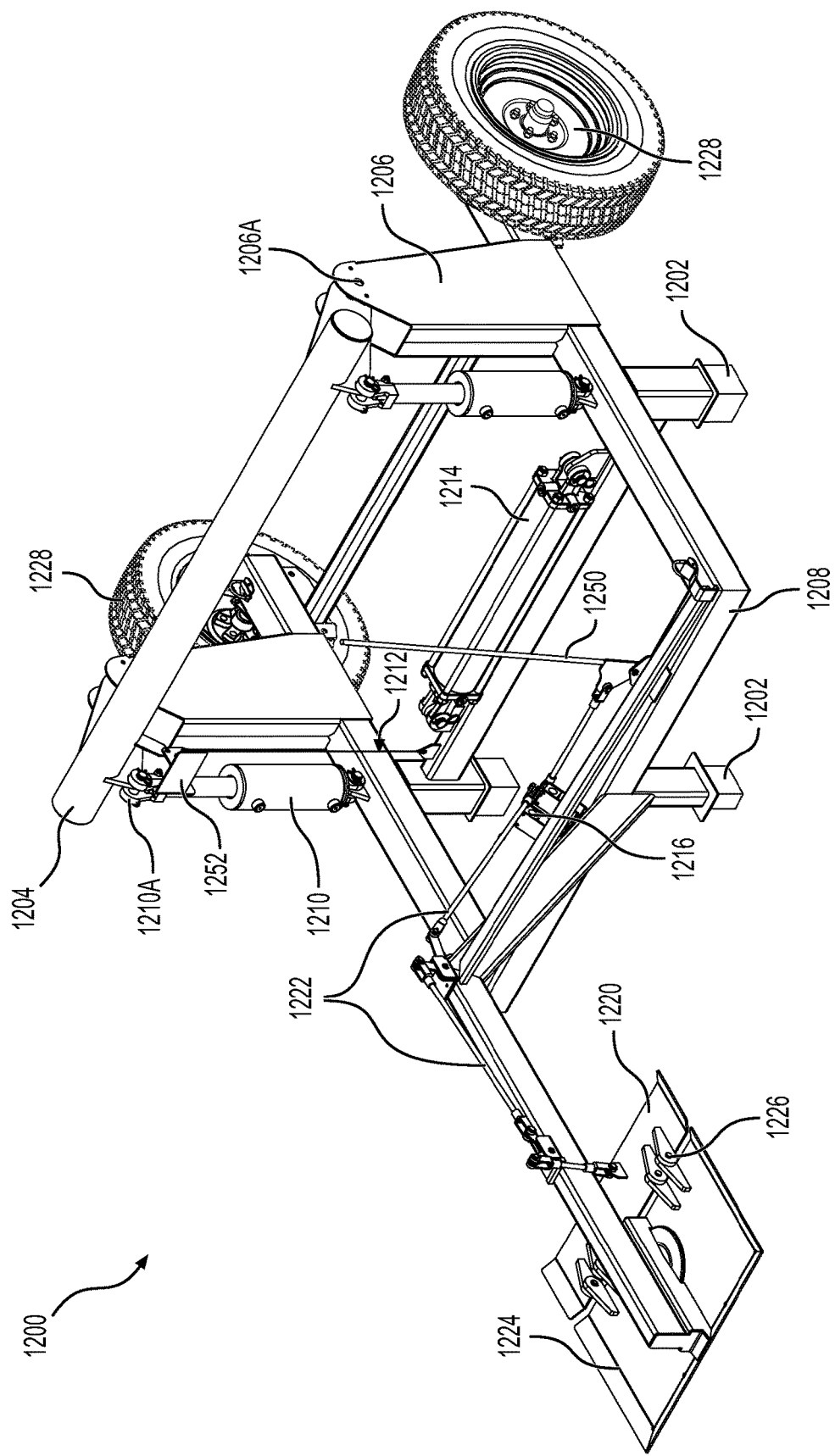
FIG. 10 is a front perspective view of the portable trailer stabilizer of FIG. 8 with signaling in the transport position.
Figure 11:
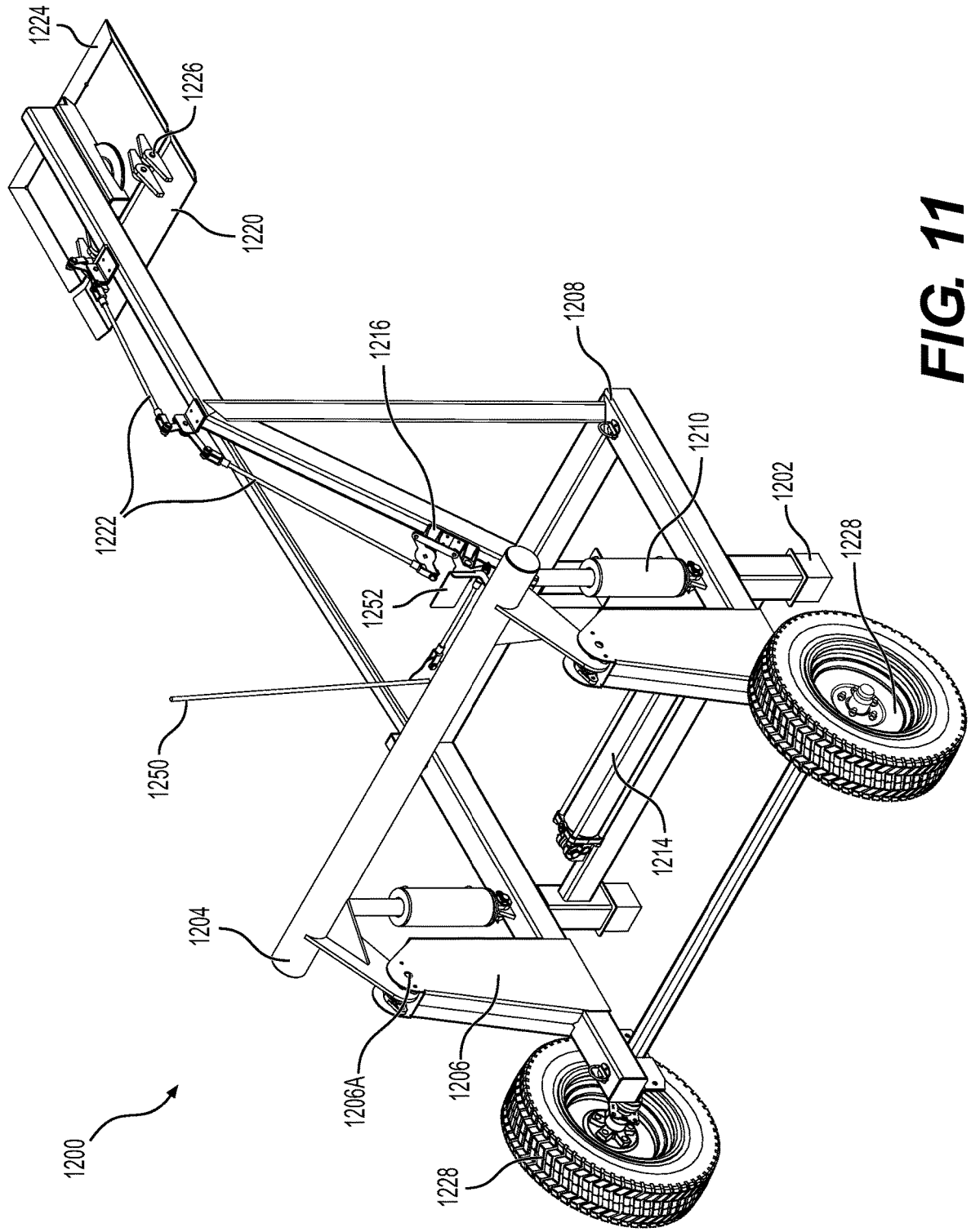
FIG. 11 is a rear elevation view of the portable trailer stabilizer of FIG. 8 with signaling in the transport position.

FIG. 8 is a front perspective view of a further example portable trailer stabilizer 1200, depicted with signaling in the notification position. FIG. 9 is a rear perspective view of the portable trailer stabilizer 1200 with signaling in the notification position, FIG. 10 is a front perspective view of the portable trailer stabilizer 1200 with signaling in the transport position, and FIG. 11 is a rear elevation view of the portable trailer stabilizer 1200 with signaling in the transport position, all according to at least some aspects of the present disclosure. Generally, portable trailer stabilizer 1200 may be similar in construction and operation to portable trailer stabilizer 200 described above. Repeated description of some similar features and operations is omitted for brevity.

Referring to FIGS. 8-11, generally, the portable trailer stabilizer 1200 may be configured to extend between the support surface 102 and the underside of the forward end portion 118 of the trailer 100 (FIG. 1), such as to stabilize and/or support the forward end portion 118 of the trailer 100.

The portable trailer stabilizer 1200 may include a support surface engagement element, such as a ground pad 1202, which may be configured to selectively engage the support surface 102. The portable trailer stabilizer 1200 may include a trailer engagement element, such as a trailer engagement bar 1204, which may be configured to selectively engage the trailer 100 (FIG. 1). The trailer engagement bar 1204 may be arranged to extend generally horizontally and/or generally laterally (e.g., side-to-side) beneath the forward end portion 118 of the trailer 100. In some example embodiments, the trailer engagement bar 1204 may be constructed from a section of metal channel or tube, such as round tube.

In some example embodiments, the support surface engagement element 1202 and the trailer engagement element 1204 may be operatively connected by one or more structural elements 1206, 1208 and/or one or more actuators, such as one or more hydraulic cylinders 1210. In other example embodiments, alternative actuators may be used, such as pneumatic or electrical actuators, electromechanical jacks, and/or a spring lifting apparatus with a ratchet and pawl mechanism to lift the trailer engagement element and secure it in place. The actuators may be configured to facilitate extension and/or retraction of the trailer engagement element relative to the support surface engagement element. For example, when pressurized hydraulic fluid is directed to the hydraulic cylinder 1210, the hydraulic cylinder 1210 may extend to extend/raise the trailer engagement element 1204 relative to the support surface engagement element 1202.

In some example embodiments, the trailer engagement element (e.g., trailer engagement bar 1204) may be coupled to the structural elements 1206, 1208 and/or the actuators (e.g., hydraulic cylinders 1210) by one or more pivot connections 1210A. For example, some pivot connections may allow the trailer engagement bar 1204 to tilt side-to-side with respect to the trailer 100. Accordingly, the portable trailer stabilizer 1200 may accommodate uneven support surfaces 102, support surfaces 102 having debris thereon, and/or tilted semi-trailers 100, for example.

In some example embodiments, the actuator may be powered by an on-board, self-contained energy source. For example, the hydraulic cylinders 1210 may be operatively connected to an on-board, self-contained hydraulic system 1212. In some example embodiments, the hydraulic system 1212 may include one or more hydraulic accumulators 1214, one or more isolation valves 1216 (e.g., ball valves), and/or one or more hydraulic conduits 1218 fluidically connecting the accumulator 1214 to the cylinders 1210 via the isolation valves 1216. The hydraulic system 1212 may comprise a closed hydraulic system. The hydraulic system 1212 may be configured so that hydraulic fluid flows between the accumulator 1214 and the cylinders 1210 via the conduits 1218 and isolation valves 1216 without external connections (during normal use).

In some example embodiments, the isolation valves 1216 may be operated (e.g., opened and/or shut) by an isolation valve operator mechanism, such as a valve operator element 1220 and/or one or more rods 1222 operatively connecting the valve operator element 1220 to the isolation valves 1216. In other example embodiments, isolation valve operator mechanisms may include cables, electrical actuators, and/or hydraulic actuators arranged to open and/or shut the isolation valves 1216.

In some example embodiments, the isolation valve operator mechanism (e.g., valve operator element 1220) may be configured for operation in connection with coupling the portable trailer stabilizer 1200 to a tractor 106, 108 (FIG. 1) and/or uncoupling the portable trailer stabilizer 1200 from a tractor 106, 108. For example, the isolation valve operator mechanism may be configured so that it is actuated by the act of coupling the portable trailer stabilizer 1200 to a tractor 106, 108 and/or the act of uncoupling the portable trailer stabilizer 1200 from a tractor 106, 108 (e.g., without additional action by an operator). For example, the valve operator element 1220 may comprise a valve operator plate coupled to a positioning element engagement element, such a fifth wheel plate 1224, via a pivot 1226. In operation, the valve operator element 1220 may be configured so that when a terminal tractor's trailer stabilizer positioning element, such as fifth wheel 112, 114, engages or disengages the fifth wheel plate 1224 of the portable trailer stabilizer 1200, the valve operator element 1220 is pivoted. Pivoting the valve operator element 1220 may operate (e.g., open and/or shut) the isolation valve 1216 via the rod 1222. For example, the isolation valve operator mechanism may be configured so that when the fifth wheel plate 1224 of the portable trailer stabilizer 1200 is disengaged from the terminal tractor's fifth wheel 112, 114, the isolation valves 1216 may be shut and/or when the fifth wheel plate 1224 of the portable trailer stabilizer 1200 is engaged with the terminal tractor's fifth wheel 112, 114, the isolation valves 1216 may be open. Some example embodiments may include one or more wheels 1228, which may facilitate repositioning the portable trailer stabilizer 1200, such as when the portable trailer stabilizer's fifth wheel plate 1224 is coupled to the terminal tractor's fifth wheel 112, 114.

In some example embodiments, the trailer engagement element 1204 may be pivotably disposed with respect to one or more of the structural elements 1206, 1208. For example, the trailer engagement bar 1204 may be coupled to the structural element 1206 by a pivot 1206A, which may allow the trailer engagement bar 204 to move generally upward and downward (e.g., at a radius from the pivot 1206A) while extending and compressing the hydraulic cylinder 1210.

In some example embodiments, the trailer engagement element (e.g., trailer engagement bar 1204) may comprise a sloped engagement surface 1240A. The engagement surface 1240A may be arranged to contact the forward end portion 118 of the trailer 100 (FIG. 1) when the portable trailer stabilizer 1200 is positioned beneath the forward end portion 118. When the trailer engagement bar 1204 is higher than the underside of the forward end portion 118 of the trailer 100, the engagement surface 1240A may contact a leading forward edge of the trailer and/or a front face of the trailer and thereafter slide along and underneath the forward end portion 118 as the portable trailer stabilizer 1200 is moved underneath the forward end portion 118. Accordingly, the contact between the trailer 100 and at least one of the engagement surface 1240A and the trailer engagement bar 1204 may press the trailer engagement bar 1204 downward, thus compressing the hydraulic cylinder 1210.

In some example embodiments, the trailer stabilizer 1200 may include one or more signal elements 1250, 1252. For example, a flag rod 1250 may pivot between a generally horizontal travel position and a generally vertical notification position to indicate whether the isolation valves 1216 are open or shut. In the illustrated embodiment, the flag rod 1250 is pivoted by a mechanical linkage (e.g., rod) operatively coupled to the valve operator element 1220. When the isolation valves 1216 are shut, the flag rod 1250 is in the generally horizontal travel or stowed position. When the isolation valves are open, the flag rod 1250 is in the generally vertical notification position. Those skilled in the art will understand that the horizontal and vertical positions of the flag rod 1250 may be switched so that a horizontal position reflects the isolation valves are open, whereas a vertical position reflects that the isolation valves are closed. Accordingly, an operator of a tractor 106, 108 can readily determine whether the isolation valves 1216 are open or shut using the position of the flag rod 1250. In addition, when the flag rod 1250 is in the generally horizontal notification position, a dock attendant inside the loading dock may view or verify the position of the flag rod using a camera image of a video camera on the outside of the loading dock to provide a form of physical sight verification.

As another example, a full up indicator 1252 may pivot between a "full up" position and a not "full up" position. In the illustrated embodiment, the full up indicator displays a flag to the operator of a tractor 106, 108 (e.g., in a generally vertical position) when the trailer engagement element 1204 is at or near its fully raised position. When the trailer engagement element 1204 is below its fully raised position, the flag of the full up indicator 1252 drops to a generally horizontal position. In the illustrated embodiment, the full up indicator 1252 is pivotably disposed on the trailer engagement element 1204 and is operated by a connector (e.g., cable), which is coupled to another portion of the trailer stabilizer 1200 that does not move with the trailer engagement element 1204. Accordingly, the operator of the tractor 106, 108 can readily determine whether the trailer engagement element 1204 is at or near its fully raised position.

Referring to FIGS. 12-16, a further example portable trailer stabilizer 300 may be configured to extend between a support surface 102 and the underside of the forward end portion 118 of the trailer 100, such as to stabilize and/or support the forward end portion 118 of the trailer 100. Alternatively, as discussed hereafter, the trailer stabilizer 300 may be positioned to not contact the trailer 100 unless the landing gear of the trailer fails or significantly sags, or the trailer frame bends under load. Portable trailer stabilizer 300 may be similar to portable trailer stabilizer 200, 1200 in construction and operation except that portable trailer stabilizer 300 may be configured to be repositioned by lifting and carrying using a trailer stabilizer positioning element 116 separate from the fifth wheel 112, 114 of the tractor 108, 110 as shown in FIG. 1 and described in more detail below. Repeated description of elements in common may be omitted for brevity.

The portable trailer stabilizer 300 may include a support surface engagement element, such as a ground pad 302, which may be configured to selectively engage the support surface 102. The portable trailer stabilizer 300 may include a trailer engagement element, such as a trailer engagement bar 304 arranged to extend generally horizontally and/or generally laterally (e.g., side-to-side) beneath the forward end portion 118 of the trailer 100. In some example embodiments, the trailer engagement bar 304 may be constructed from a section of metal channel or tube, such as round tube.

In some example embodiments, the support surface engagement element 302 and the trailer engagement element 304 may be operatively connected by one or more structural elements 306, 308 and/or one or more actuators, such as one or more hydraulic cylinders 310. In other example embodiments, alternative actuators may be used, such as pneumatic or electrical actuators and/or electromechanical jacks, and/or springs, and/or ratchets, and/or pawls. The actuators may be configured to facilitate extension and/or retraction of the trailer engagement element 304 relative to the support surface engagement element 302.

In some example embodiments, the trailer engagement element (e.g., trailer engagement bar 304) may be coupled to the structural elements 306, 308 and/or the actuators (e.g., hydraulic cylinders 310) by one or more pivot connections 310A that may include a pivot pin. For example, some pivot connections may allow the trailer engagement bar 304 to tilt side-to-side with respect to the trailer, in addition to pivoting front-to-rear. Accordingly, the portable trailer stabilizer 300 may accommodate debris and uneven support surfaces 102 and/or tilted semi-trailers 100, for example.

In some example embodiments, the actuators may be powered by one or more on-board, self-contained energy sources. For example, the hydraulic cylinders 310 may be operatively connected to an on-board, self-contained hydraulic system 312. In some example embodiments, the hydraulic system 312 may include one or more hydraulic accumulators 314, one or more isolation valves 316 (e.g., ball valves), one or more relief valves 317, and/or one or more hydraulic conduits 318 fluidically connecting the accumulator 314, the cylinders 310, and valves 316, 317. Although the example embodiment of FIGS. 12-15 is shown with two hydraulic cylinders 310 coupled to one accumulator 314 via respective isolation valves 316, some example embodiments may include one or more hydraulic cylinders 310, one or more accumulators 314, and/or one or more isolation valves 316 (or other flow control devices). In some example embodiments, the isolation valves 316 may be operated (e.g., opened and/or shut) by an isolation valve operator mechanism, such as valve operator elements 320 and/or cables 322 operatively connecting the valve operator elements 320 to the isolation valves 316. In other example embodiments, isolation valve operator mechanisms may include mechanical linkages, electrical actuators, and/or hydraulic actuators arranged to open and/or shut the isolation valves 316.

In some example embodiments, the isolation valve operator mechanism (e.g., valve operator elements 320) may be configured for operation in connection with coupling the portable trailer stabilizer 300 to a tractor 108 and/or uncoupling the portable trailer stabilizer from a tractor 108. For example, the isolation valve operator mechanism 320 may be configured so that it is actuated by the act of coupling the portable trailer stabilizer 300 to a tractor 108 and/or the act of uncoupling the portable trailer stabilizer from a tractor 108. For example, the portable trailer stabilizer 300 may include one or more positioning element engagement elements, such as conduits 324, configured to receive respective arms 120 of the trailer stabilizer positioning element 116 (described below). The conduits 324 of the portable trailer stabilizer 300 may be spaced apart a distance corresponding to a distance between the arms 120 of the trailer stabilizer positioning element 116. In some example embodiments, the conduits 324 may include respective bell mouths 326 to facilitate engagement of the arms 120 with the conduits 324.

In some example embodiments, the valve operator elements 320 may be configured so that when the arms 120 of the trailer stabilizer positioning element 116 engage or disengage the conduits 324 of the portable trailer stabilizer 300, the valve operator elements 320 are moved (e.g., pivoted). Moving the valve operator elements 320 may operate (e.g., open and/or shut) the isolation valves 316 via the cables 322. For example, the isolation valve operator mechanism may be configured so that when the conduits 324 of the portable trailer stabilizer 300 are disengaged from the arms 120 of the trailer stabilizer positioning element 116, the isolation valves 316 are shut and/or when the conduits 324 of the portable trailer stabilizer 300 are engaged with the arms 120 of the trailer stabilizer positioning element 116, the isolation valves 316 are opened.

In some example embodiments, the trailer engagement element 304 may be pivotably disposed with respect to one or more of the structural elements 306, 308. For example, the trailer engagement bar 304 may be coupled to the structural element 306 by a pivot 306A that may include a pin, which may allow the trailer engagement bar 304 to move generally upward and downward (e.g., at a radius from the pivot 306A) while extending and compressing the hydraulic cylinder 310. In some example embodiments, the trailer engagement element (e.g., trailer engagement bar 304) may comprise one or more sloped engagement surfaces 304A. The engagement surfaces 304A may be arranged to contact a forward edge of the forward end portion 118 of the trailer 100 when the portable trailer stabilizer 300 is positioned beneath the forward end portion 118. When the trailer engagement bar 304 is higher than the underside of the forward end portion 118 of the trailer 100, the engagement surfaces 304A may contact and be forced downward to slide below and along the forward end portion 118 as the portable trailer stabilizer 300 is moved underneath the forward end portion 118. Accordingly, the contact between the engagement surfaces 304A and/or the trailer engagement bar 304 may press the trailer engagement bar 304 downward, thus shortening the hydraulic cylinders 310.

Figure 12:
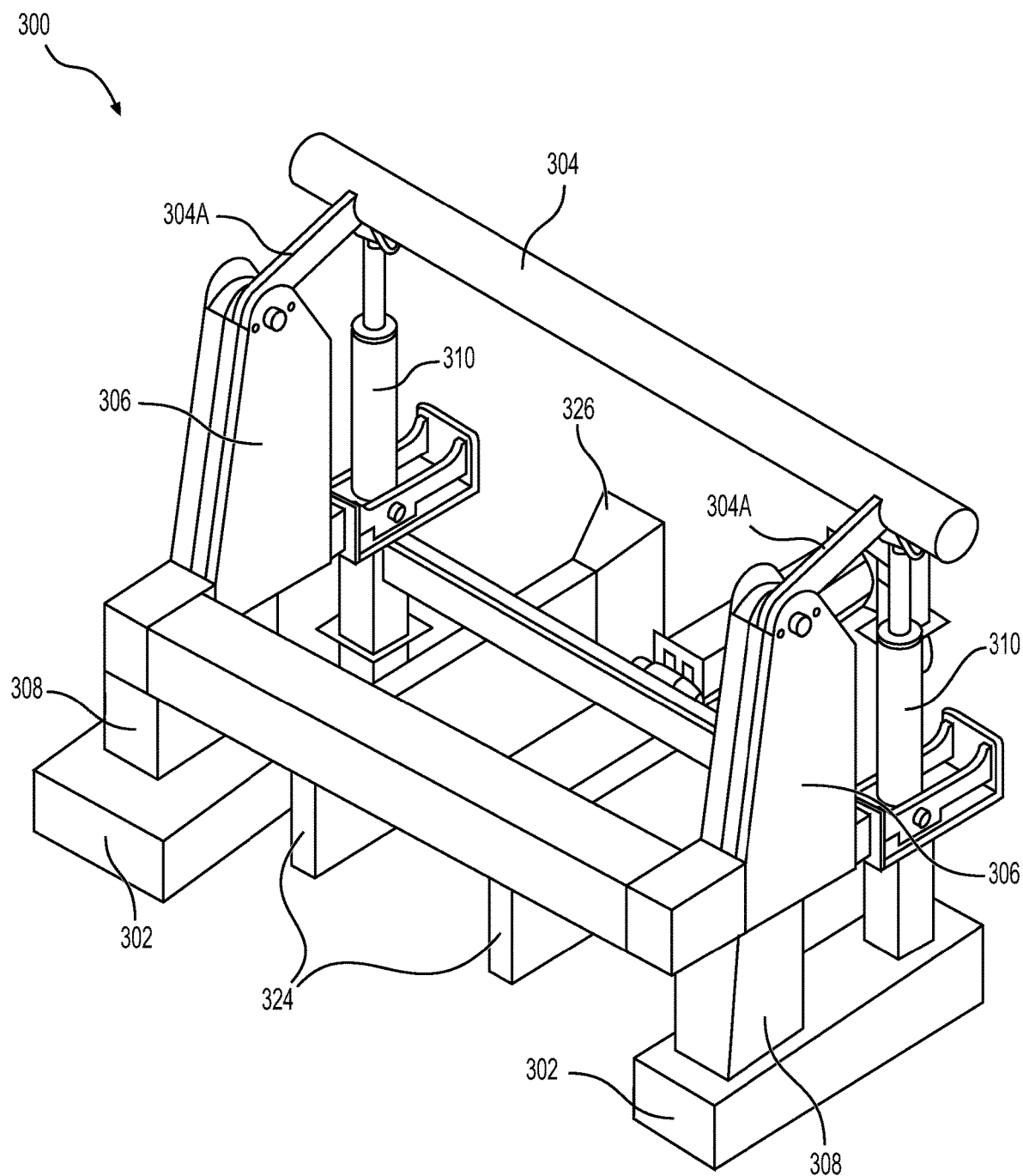
FIG. 12 is a perspective view of another example portable trailer stabilizer showing various aspects of an example portable trailer stabilizer according to at least some aspects of the present disclosure.
Figure 12A:
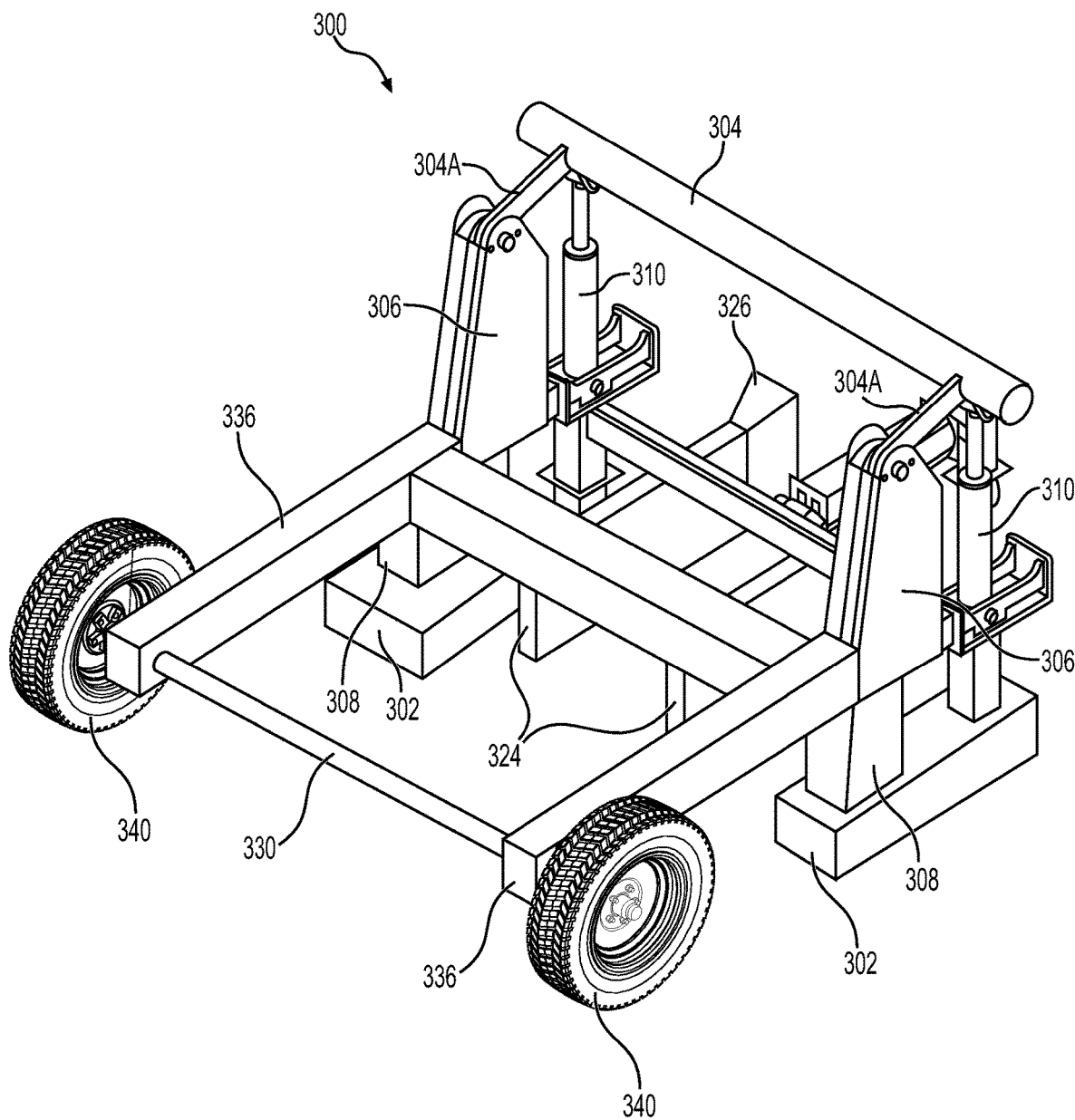
FIG. 12A is a plan view of the portable trailer stabilizer of FIG. 12 shown with a wheeled configuration.
Figure 13:
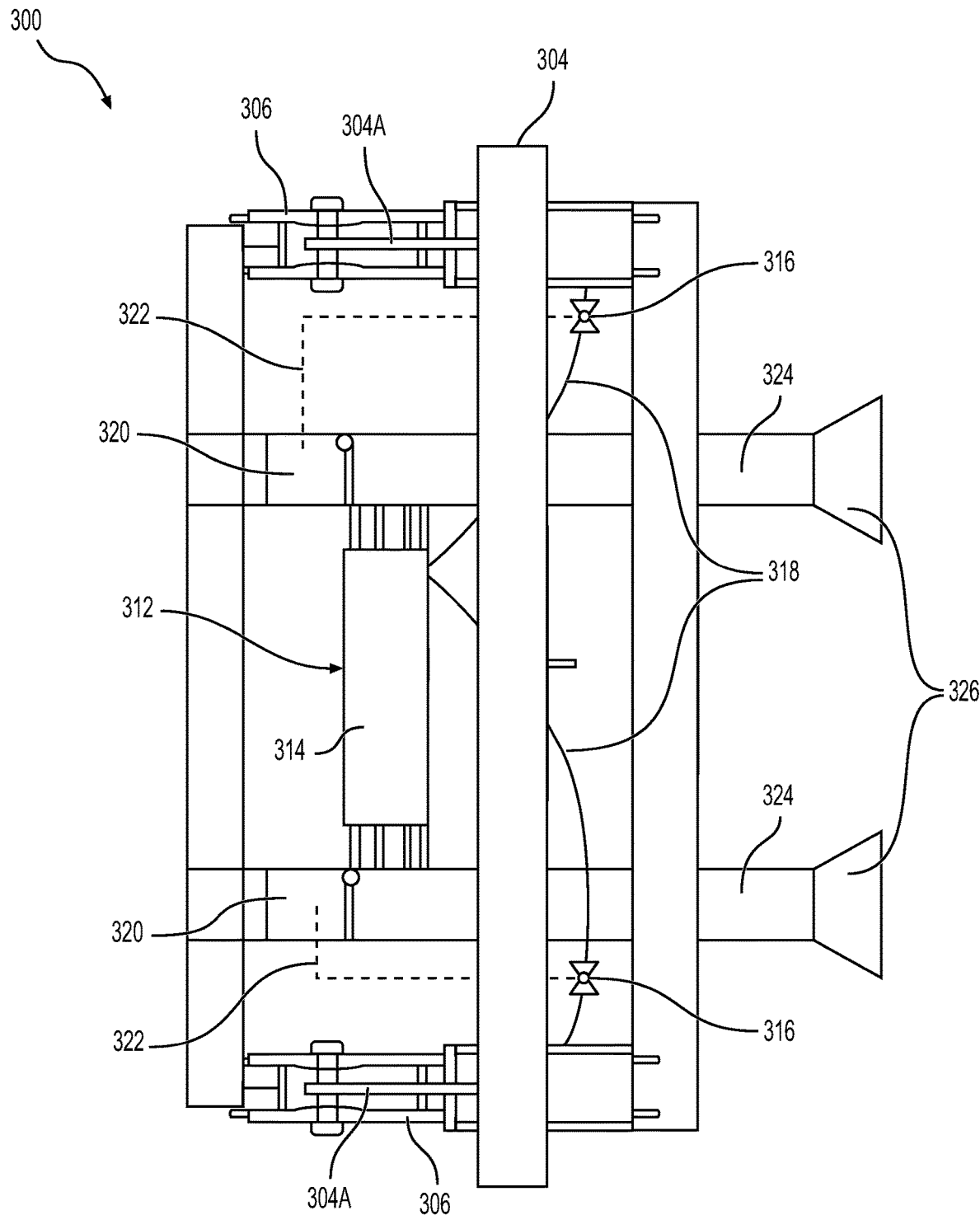
FIG. 13 is a plan view of the portable trailer stabilizer of FIG. 12.
Figure 14:
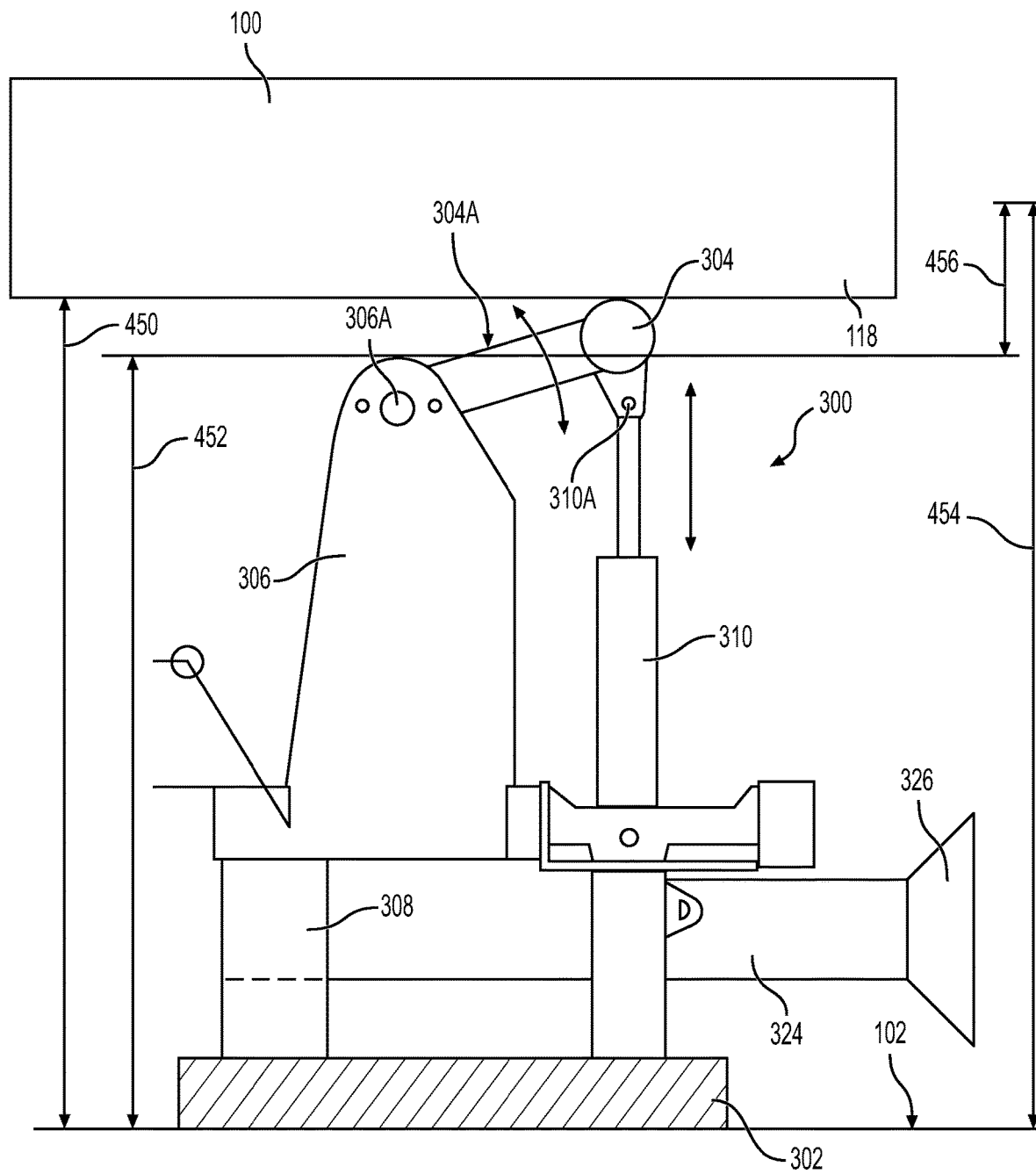
FIG. 14 is a side elevation view of the portable trailer stabilizer of FIG. 12.
Figure 15:
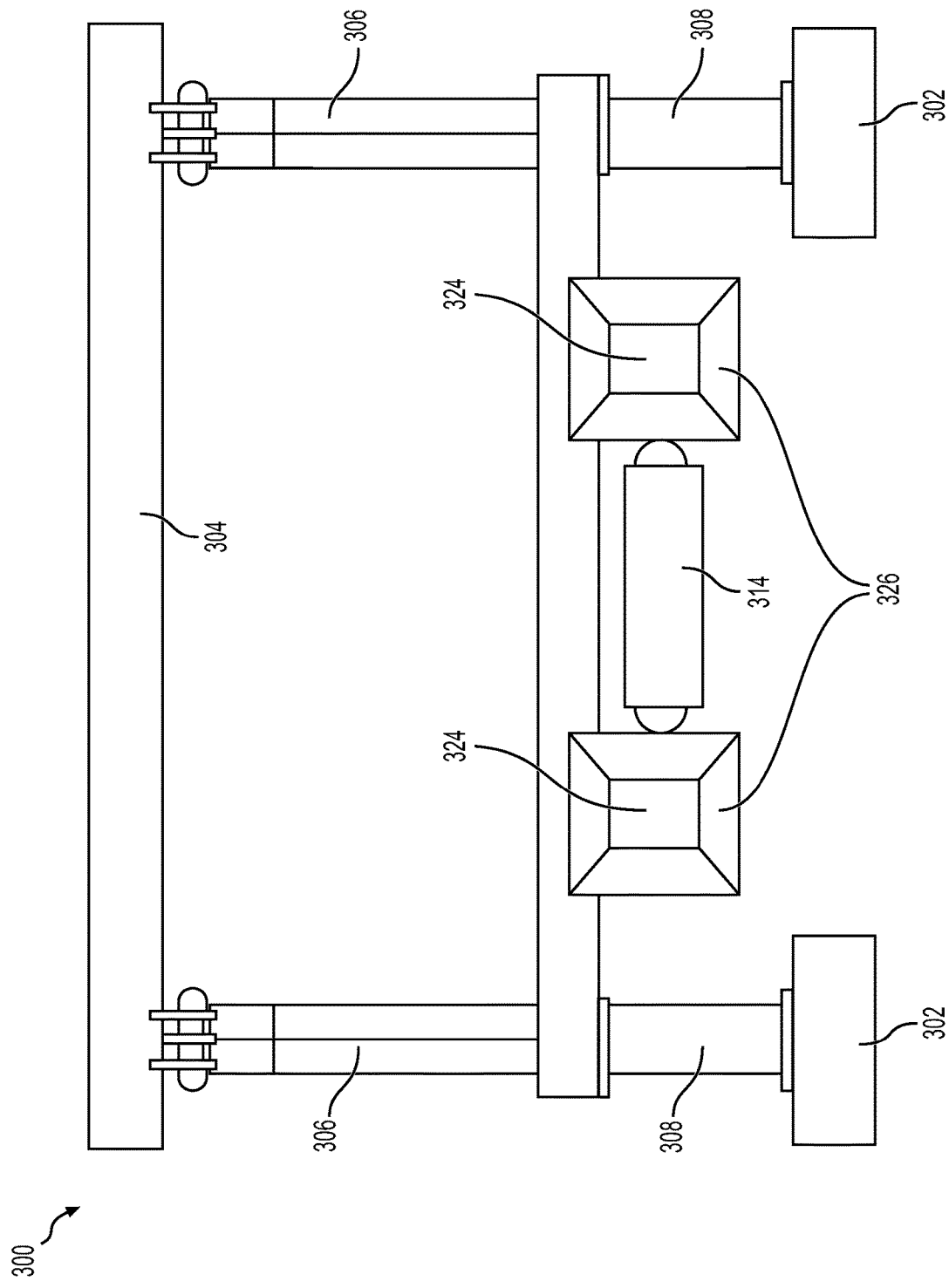
FIG. 15 is a rear elevation view of the portable trailer stabilizer of FIG. 12.

As depicted in FIG. 12A, the exemplary portable trailer stabilizer 300 may include extended rails 336 to which are mounted an axle 330. Opposing ends of the axle 330 are mounted to respective wheel and tire combinations 340. By incorporating the axle 330 and the wheel and tire combinations 340, the exemplary portable trailer stabilizer 300 may be repositioned without requiring the entire stabilizer 300 to be lifted off the ground.

Figure 16:
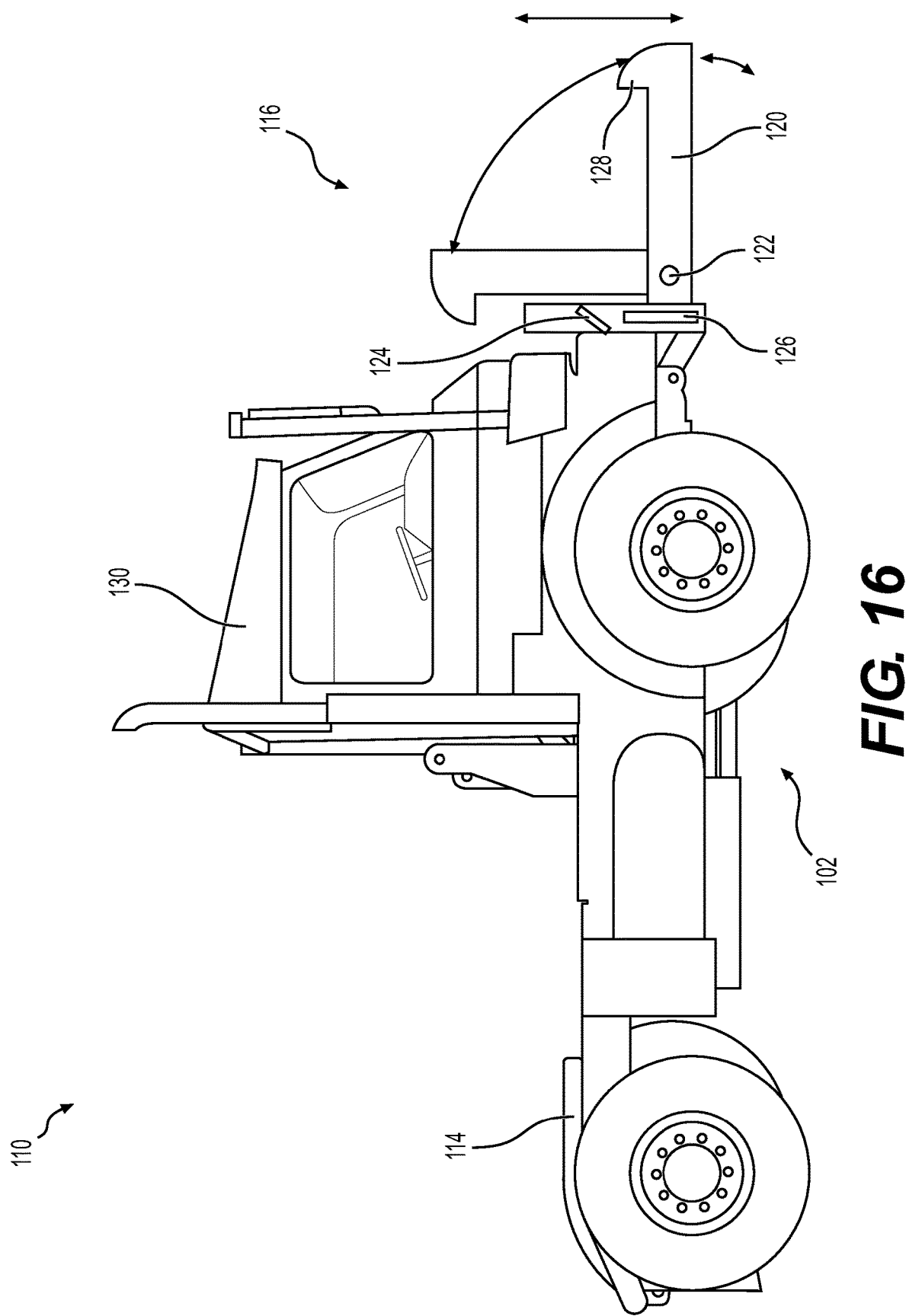
FIG. 16 is a simplified side elevation view of a first example terminal tractor including a trailer stabilizer positioning element separate from the terminal tractor's fifth wheel, all according to at least some aspects of the present disclosure.

Looking to FIG. 16, the arms 120 of the trailer stabilizer positioning element 116 may be pivotable, such as about a pivot 122, so that the arms 120 may be pivoted between a generally horizontal extended configuration and a generally vertical retracted configuration. In the extended configuration, the arms 120 may be pivotable above and/or below generally horizontal, such as to facilitate engagement of the arms 120 with a portable trailer stabilizer 300 that may be positioned on an even support surface 102 or on a tilted and/or uneven support surface 102. In some example embodiments, the arms 120 may be pivoted by one or more actuators, such as a hydraulic cylinder 124.

In some example embodiments, the trailer stabilizer positioning element 116 may be vertically repositionable relative to the terminal tractor, such as to vary the height of the arms 120 above the support surface 102. In some example embodiments, the trailer stabilizer positioning element 116 may include one or more actuators, such as a hydraulic cylinder 126, which may be arranged to raise and/or lower the arms 120.

In some example embodiments, the trailer stabilizer positioning element 116 may be horizontally repositionable relative to the terminal tractor, such as to vary the horizontal length of the arms 120 above the support surface 102. In some example embodiments, the trailer stabilizer positioning element 116 may include one or more actuators, such as a hydraulic cylinder 124, which may be arranged to extend and contract the arms 120 and change the longitudinal length thereof.

Some example arms 120 may include an engagement element, such as a hook 128, which may be disposed proximate a distal end portion of the arm 120. Some example engagement elements may be configured to selectively retain a portable trailer stabilizer 300 on the arms 120. In some example embodiments, one or more of the engagement elements (e.g., hooks 128, 1120, 2120) may be arranged to move the isolation valve operator mechanism (e.g., by contacting the valve operator elements 320, 2320, 1320) of the portable trailer stabilizer 300.

Figure 17:
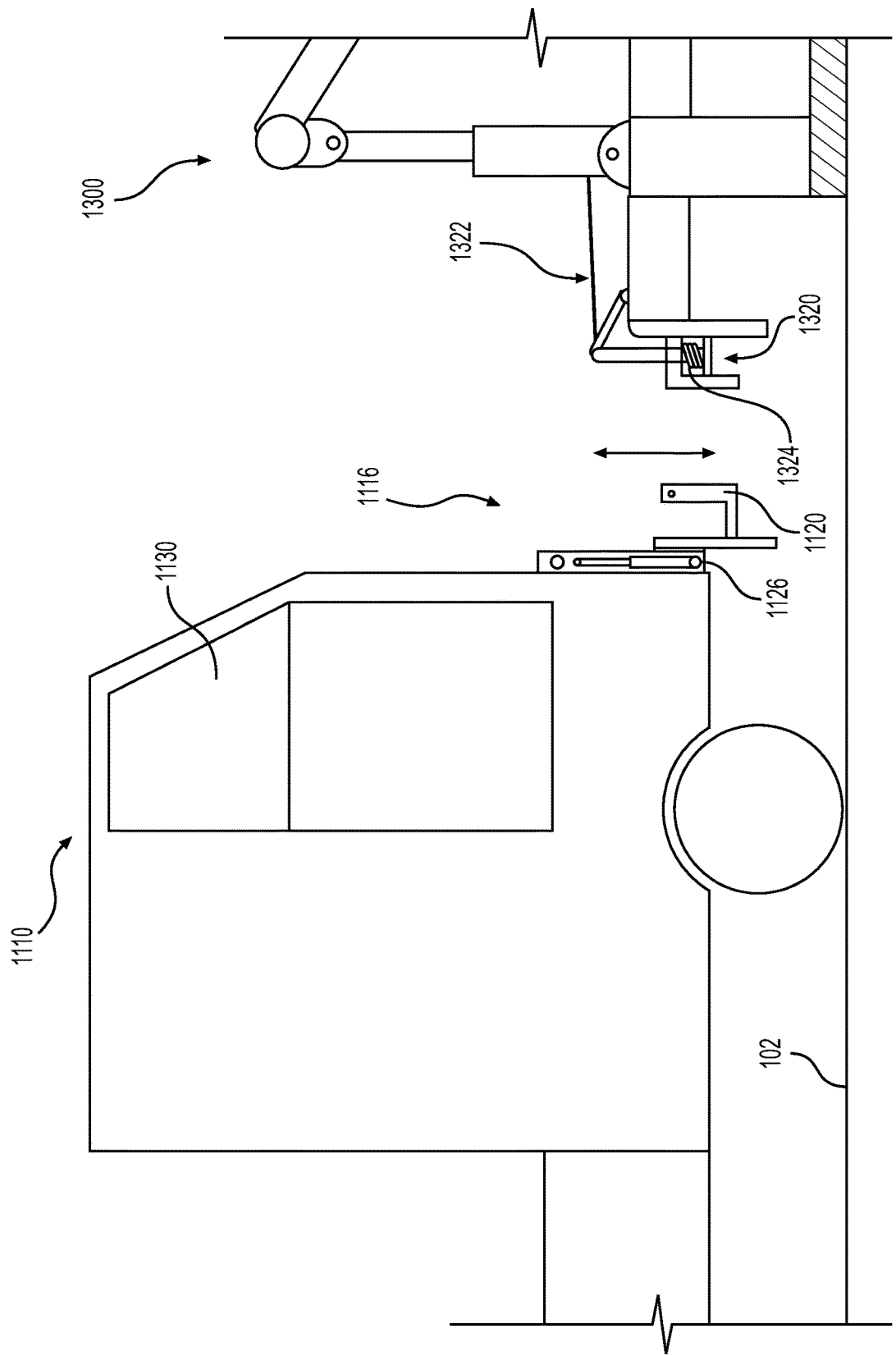
FIG. 17 is a simplified side elevation view of a second example terminal tractor including a trailer stabilizer positioning element separate from the terminal tractor's fifth wheel, all according to at least some aspects of the present disclosure.
Figure 18:
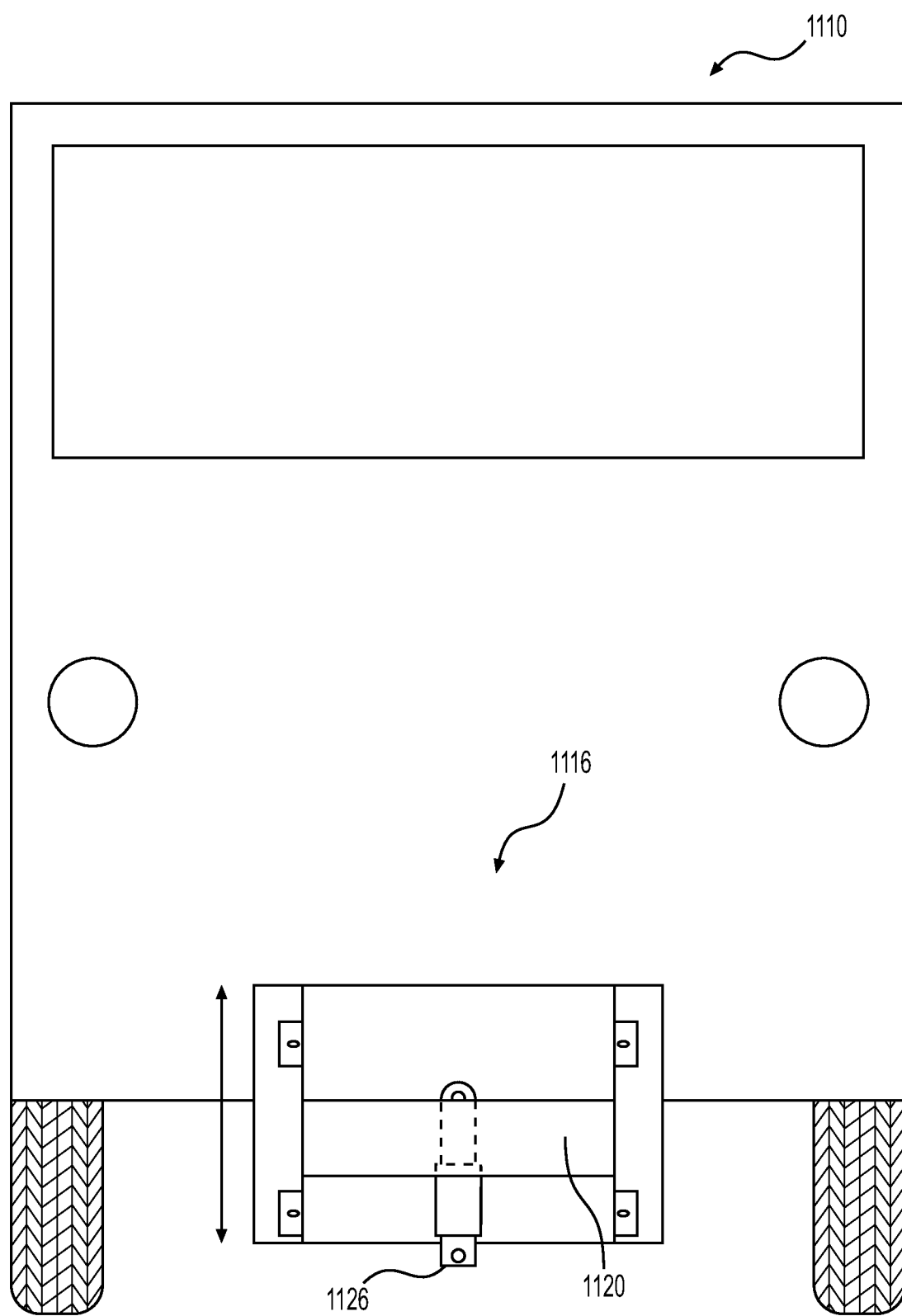
FIG. 18 is a front elevation view of a third example terminal tractor including a trailer stabilizer positioning element separate from the terminal tractor's fifth wheel, all according to at least some aspects of the present disclosure.

Turning to FIGS. 17 and 18, an example terminal tractor 1110 may include a fifth wheel (which may be used to couple to semi-trailers), a trailer stabilizer positioning element 1116 (which may be used to couple to portable trailer stabilizers), and/or an operator cab 1130. In the context of a remote or autonomous tractor 1110, the operator cab 1130 may be optional. In some example embodiments, the trailer stabilizer positioning element 1116 may comprise one or more generally laterally oriented hooks 1120, which may be arranged on a forward portion of the terminal tractor 1110. For example, each hook 1120 may be generally elongated and/or may have a generally upwardly facing opening. In some alternative example embodiments, one or more trailer stabilizer positioning elements (e.g., one or more hooks 1120) may be arranged to operate on one or multiple sides of the tractor 1110 (e.g., for side deployment of the stabilizer) and/or from the rear of the tractor 1110 (e.g., for rearward deployment of the stabilizer).

In some example embodiments, the trailer stabilizer positioning element 1116 may be vertically repositionable relative to the terminal tractor 1100, such as to vary the height of the hooks 1120 above the support surface 102. In some example embodiments, the trailer stabilizer positioning element 1116 may include one or more actuators, such as a hydraulic cylinder 1126, which may be arranged to raise and/or lower the hooks 1120. It should be noted that in lieu of hooks 1120, the trailer stabilizer positioning element may comprise an elongated trough.

In some example embodiments, the trailer stabilizer positioning element 1116 may be horizontally repositionable relative to the terminal tractor 1100, such as to vary the horizontal position of the device with respect to the terminal tractor. In some example embodiments, the trailer stabilizer positioning element 1116 may include one or more actuators, such as a hydraulic cylinder, which may be arranged to extend and contract the horizontal position of the hook(s) 1120.

The terminal tractor 1100 including the trailer stabilizer positioning element 1116 may be used with a further exemplary portable trailer stabilizer 1300 (see FIG. 17). The portable trailer stabilizer 1300 may be generally similar to the earlier portable trailer stabilizer 300, and repeated description of elements in common may be omitted for brevity. The portable trailer stabilizer 1300 may include one or more positioning element engagement elements, such as inverted hooks or an inverted trough 1324, which may be configured to selectively engage the hooks/trough 1120 of the trailer stabilizer positioning element 1116. In some example embodiments, the hooks/trough 1324 of the portable trailer stabilizer 1300 may be generally laterally oriented and/or may include a generally downwardly facing opening. One or more valve operator elements 1320, which may be movably disposed within an opening defined by the hooks/trough 1324, may be configured so that engagement of the hooks/trough 1120 of trailer stabilizer positioning element 1116 of the terminal tractor 1110 with the hooks/trough 1324 of the portable trailer stabilizer 1300 may operate isolation valves in the manner described above. For example, engaging the hooks/trough 1324 with the hooks/trough 1120 may move the valve operator element 1320, which may operate the isolation valves via an isolation valve operator mechanism 1322.

Figure 19:
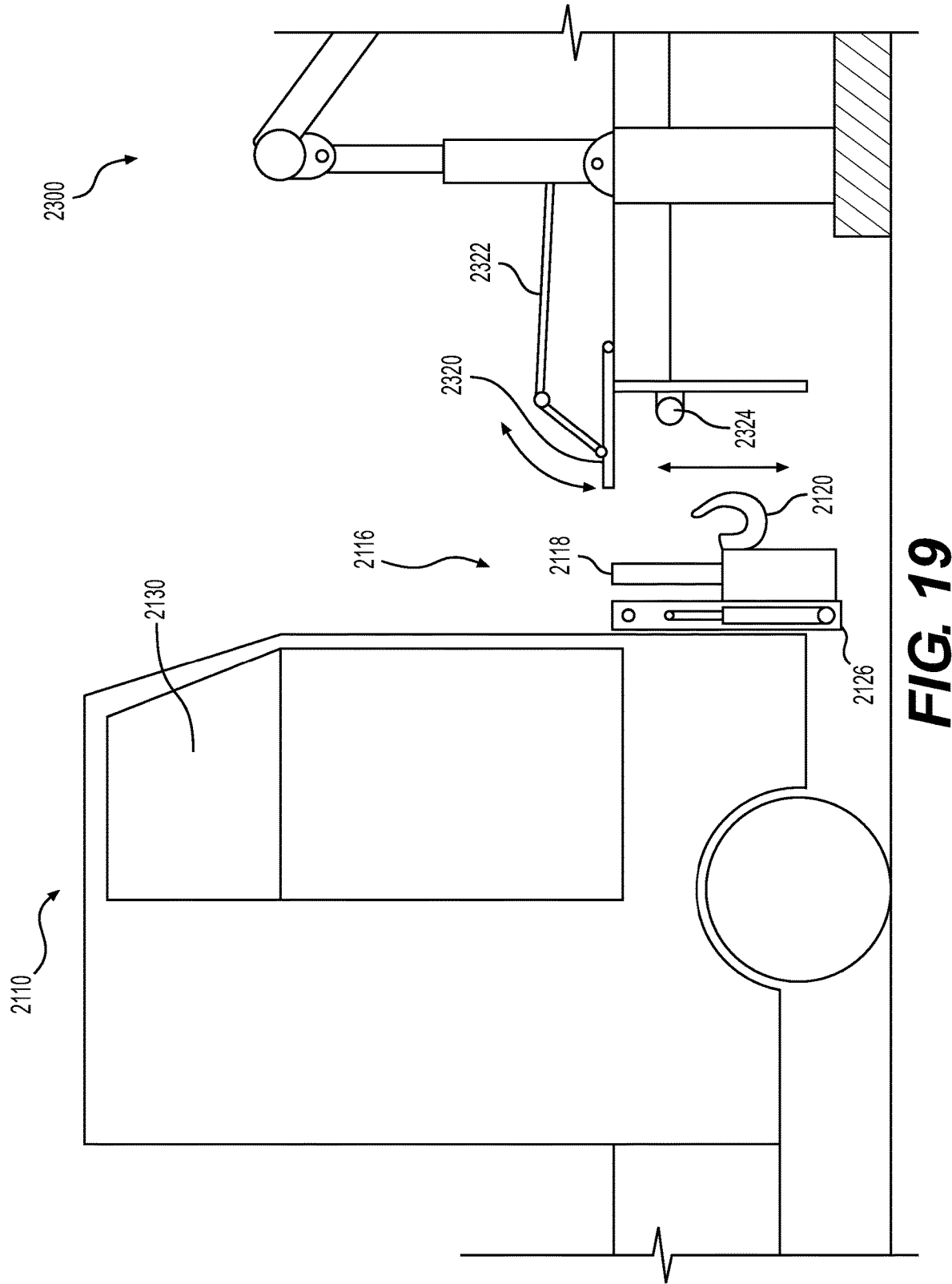
FIG. 19 is a simplified side elevation view of yet another exemplary terminal tractor including a trailer stabilizer positioning element separate from the terminal tractor's fifth wheel, all according to at least some aspects of the present disclosure.
Figure 20:
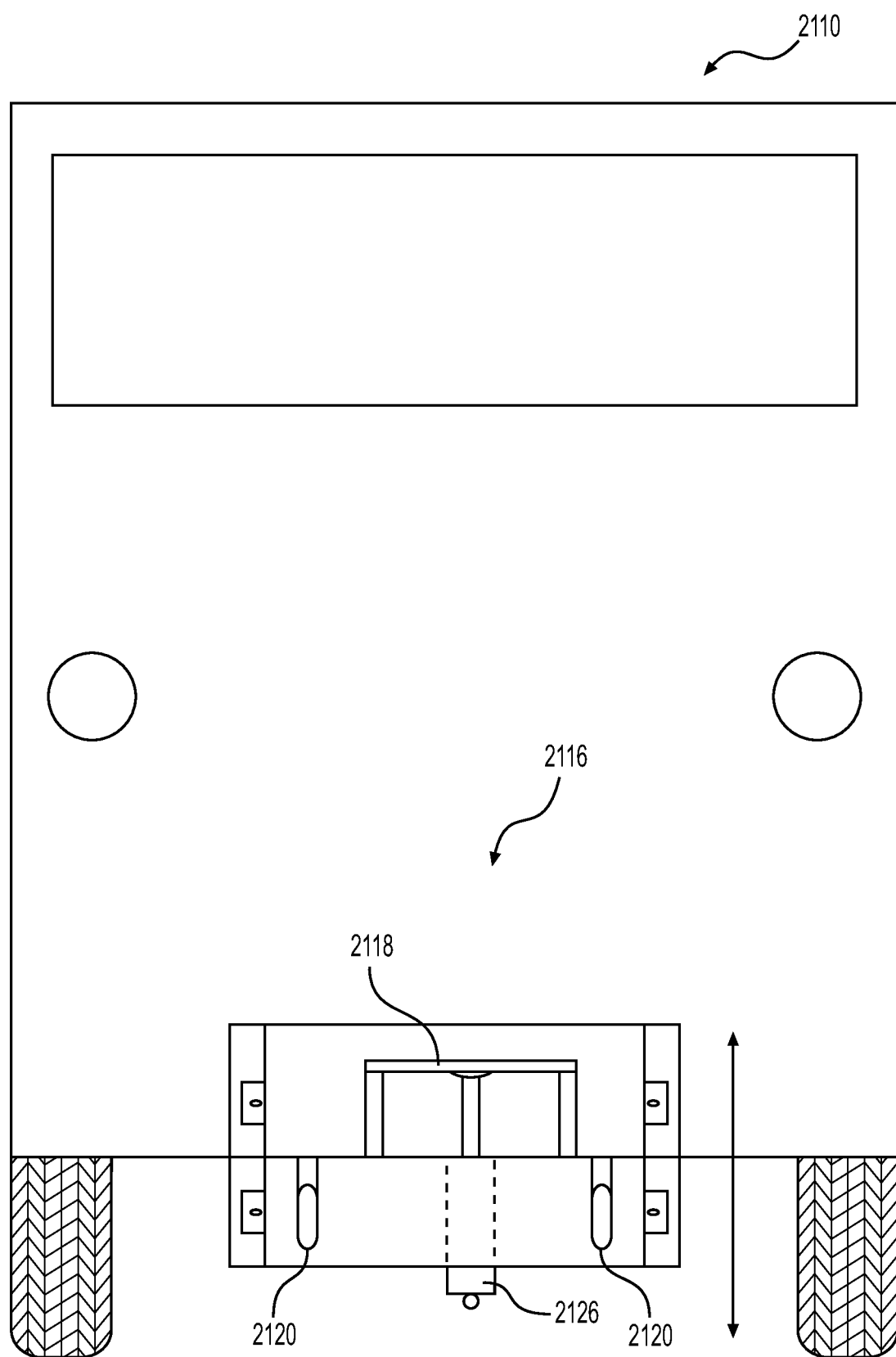
FIG. 20 is a front elevation view of the exemplary terminal tractor of FIG. 19.

Referencing FIGS. 19 and 20, another example exemplary terminal tractor 2110 is depicted that includes a trailer stabilizer positioning element 2116 separate from the terminal tractor's fifth wheel. In exemplary form, the terminal tractor 2110 may include a fifth wheel (which may be used to couple to semi-trailers), the trailer stabilizer positioning element 2116 (which may be used to couple to portable trailer stabilizers), and/or an operator cab 2130. In some example embodiments, the trailer stabilizer positioning element 2116 may comprise one or more hooks 2120 (or a trough), which may be arranged on a forward portion of the terminal tractor 2110. For example, the hooks 2120 may be laterally spaced apart and/or may have generally upwardly facing openings. In some alternative example embodiments, one or more trailer stabilizer positioning elements (e.g., one or more hooks 2120) may be arranged to operate on one or multiple sides of the tractor 2110 (e.g., for side on deployment of the stabilizer) and/or from the rear of the tractor 2110 (e.g., for rearward deployment of the stabilizer).

In some example embodiments, the trailer stabilizer positioning element 2116 may be vertically repositionable relative to the terminal tractor 2110, such as to vary the height of the hooks 2120 above the support surface 102. In some example embodiments, the trailer stabilizer positioning element 2116 may include one or more actuators, such as a hydraulic cylinder 2126, which may be arranged to raise and/or lower the hooks 2120.

In some example embodiments, the trailer stabilizer positioning element 2116 may be horizontally repositionable relative to the terminal tractor 2110, such as to vary the horizontal spacing of the hooks 2120 relative to a side (e.g., front, rear, left, right) of the terminal tractor. In some example embodiments, the trailer stabilizer positioning element 2116 may include one or more actuators, such as a hydraulic cylinder, which may be arranged to extend and contract to vary the horizontal position of the hooks 2120 with respect to a side of the tractor.

The terminal tractor 2100 including the trailer stabilizer positioning element 2116 may be used with a further example exemplary portable trailer stabilizer 2300. The portable trailer stabilizer 2300 may be generally similar to portable trailer stabilizers 300, 1300, and repeated description of elements in common may be omitted for brevity. The portable trailer stabilizer 2300 may include one or more positioning element engagement elements, such as a bar 2324, which may be configured to selectively engage the hooks 2120 of the trailer stabilizer positioning element 2116. In some example embodiments, the bar 2324 of the portable trailer stabilizer 2300 may be generally laterally oriented and/or generally horizontal. One or more valve operator elements 2320, which may be movably disposed relative to the bar 2324, may be configured so that engagement of the trailer stabilizer positioning element 2116 of the terminal tractor 2110 with the bar 2324 of the portable trailer stabilizer 2300 may operate isolation valves in the manner described above. For example, the trailer stabilizer positioning element 2116 of the terminal tractor 2110 may include a tractor valve operator element 2118, which may be configured to engage a stabilizer valve operator element 2320, such as a pivotable plate. The stabilizer valve operator element 2320 may operate the isolation valves via an isolation valve operator mechanism 2322.

Referring back to FIGS. 12A and 12-15, some example portable trailer stabilizers 300 according to at least some aspects of the present disclosure may be configured in consideration of trailers having undersides with varied spacings from the ground or a support surface. For example, some portable trailer stabilizers 300 may be configured to accommodate trailers 100 with an undersurface at a given height 450 (see FIG. 14). Some portable trailer stabilizers 300 may have a minimum height 452, which may be less than the given trailer height 450, to facilitate positioning of the portable trailer stabilizer 300 beneath an underside of the trailer 100. For example, the minimum height 452 may be the height of the portable trailer stabilizer 300 when the trailer engagement tube 304 is fully retracted relative to the ground pad 302. Some portable trailer stabilizers 300 may have a maximum height 454, which may be greater than or equal to the highest height of the undersurface of a trailer. For example, the maximum height 454 may be the height of the portable trailer stabilizer 300 when the trailer engagement tube 304 is fully spaced relative to the ground pad 302. In some example embodiments, the maximum height 454 of the stabilizer 300 may comprise the minimum height 452 plus a travel range 456. For example, the travel range 456 may be the height above the minimum height 452 that the trailer engagement tube 304 may be configured to occupy by operation of the hydraulic cylinder 310. Although these height parameters have been described in connection with the embodiment shown in FIGS. 12A and 12-15, similar height parameters may be applicable to other example stabilizer embodiments according to at least some aspects of the present disclosure, such as the portable trailer stabilizers 200, 1200, 1300, 2300 as described herein.

In some example embodiments according to at least some aspects of the present disclosure, the minimum height 452 may be about 40 inches to about 42 inches. In some circumstances, such a minimum structure height may provide support for the semi-trailer should the repositioning mechanism of the trailer stabilizer bar 304 (e.g., hydraulics) fail. In some example embodiments, the maximum height 454 may be about 52 inches. In some example embodiments, the structure of the stabilizer may be height adjustable to facilitate use with trailer heights 450 out of the normal travel range 456. In some such embodiments, adjusting the height-adjustable structure may allow the structure to be reconfigured to have lower or higher minimum heights 452 and maximum heights 454. Generally, stabilizers according to at least some aspects of the present disclosure may be constructed to operate at any heights necessary to facilitate use with trailers of a particular height or range of heights.

Figure 21:
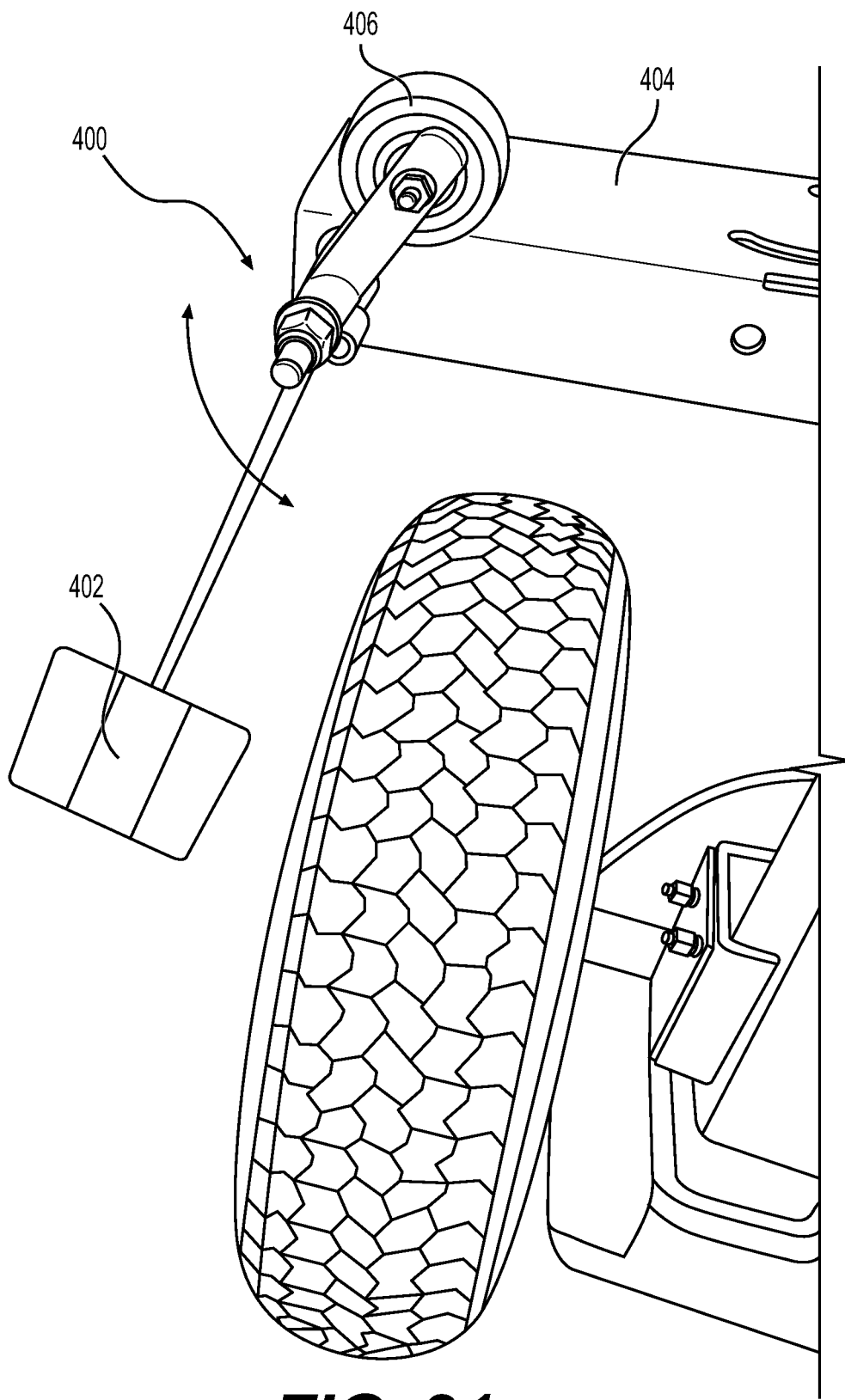
FIG. 21 is a perspective view of an example indicator according to at least some aspects of the present disclosure.

Referring to FIG. 21, an indicator 400 may be included as part of any one of the foregoing portable trailer stabilizers 200, 300, 1200, 1300, 2300. The indicator 400 may include a signal element, such as a pivotably disposed flag 402, which may be arranged to visually indicate whether a portable trailer stabilizer is positioned to support a parked trailer. For example, when a trailer engagement bar 404 (equivalent to the stabilizer bars 204, 304, 1204) of a portable trailer stabilizer is not engaged with the underside of a trailer, the flag 402 may be in the generally vertical, generally downward position shown in FIG. 21. When the trailer engagement bar 404 of the portable trailer stabilizer approximates or is in contact with the underside the trailer, the flag 402 may extend generally horizontally and/or laterally outward from the stabilizer to evidence the stabilizer is in a support position with respect to the parked trailer. For example, the indicator 400 may include a linkage and roller 406 operatively coupled to the flag 402 so that contact between the roller 406 and the undersurface of the parked trailer may result in repositioning of the flag 402. Accordingly, the stabilizer status of the portable trailer stabilizer may be determined by individuals viewing the position of the indicator flag 402. In some circumstances, the indicator flag 402 may be viewed directly by individuals with a direct line of sight thereto, such as individuals in the area of the portable trailer stabilizer. In some circumstances, the indicator flag 402 may be viewed indirectly by individuals utilizing a remote viewing device, such as individuals inside a warehouse viewing the indicator flag 402 position on a screen displaying an image obtained by a camera outside of the warehouse. In some example embodiments, the flag 402 may include reflective elements and/or other visibility enhancing features to allow visual differentiation between the flag's position 402 reflecting the stabilizer in a stabilizing position versus a non-stabilizing position.

Some example methods of operating a portable trailer stabilizer are described below. Various example methods according to at least some aspects of the present disclosure may include any combination of any one or more of the steps or operations discussed below.

Some example methods of supporting or providing support for a trailer using a portable trailer stabilizer 200, 1200, 300, 1300, 2300 may include parking a trailer 100 in a desired location using a tractor 106, 108, 110 and disconnecting the tractor 106, 108, 110 from the trailer 100 (e.g., disconnecting the fifth wheel plate of the trailer from the fifth wheel of the tractor 106, 108, 110). For example, the tractor 106, 108, 110 (e.g., while operatively coupled to the trailer 100) may be driven rearward to reposition the trailer 100 at a loading dock bay 104A. Upon termination of the repositioning, the trailer 100 may be decoupled from the tractor 106, 108, 110, leaving the trailer 100 parked in position. The tractor 106, 108, 110 (e.g., while operatively decoupled from the trailer) may be driven forward to vacate the position immediately in front of the forward end portion 118 of the parked trailer 100.

A tractor 108, 110 may be coupled to a portable trailer stabilizer 200, 1200, 300, 1300, 2300, which may be operative to open the isolation valves 216, 1216, 316 of the portable trailer stabilizer. In particular, engagement of the stabilizer 200, 1200, 300, 1300, 2300 by the tractor 108, 110 may be operative to reposition the isolation valves 216, 1216, 316 so that fluid can flow between the actuators 210, 1210, 310 and the accumulator 214, 1214, 314, as will be discussed in more detail hereafter. Repositioning the isolation valves 216, 1216, 316 may direct hydraulic fluid to or from the hydraulic accumulator 214, 1214, 314 to or from the hydraulic cylinders 210, 1210, 310, thus varying the effective length of the hydraulic cylinders 210, 1210, 310 (if not already fully extended or fully retracted). By way of example, higher pressurized fluid from the hydraulic accumulator 214, 1214, 314 flowing to the hydraulic cylinders 210, 1210, 310 would be operative to extend the hydraulic cylinders where the fluid pressure within the cylinders is less than that of the accumulator. Conversely, higher pressurized fluid from the hydraulic cylinders 210, 1210, 310 flowing to the accumulator 214, 1214, 314 would be operative to retract the hydraulic cylinders where the fluid pressure within the cylinders is greater than that of the accumulator.

Coupling the tractor 108, 110 to the portable trailer stabilizer 200, 1200, 300, 1300, 2300 may include coupling a trailer stabilizer positioning element (e.g., fifth wheel 112, 114 and/or trailer stabilizer positioning element 116) of the tractor 108, 110 to a positioning element engagement element (e.g., fifth wheel plate 224 and/or conduits 324) of the portable trailer stabilizer 200, 1200, 300, 1300, 2300. In this fashion, the portable trailer stabilizer 200, 1200, 300, 1300, 2300 may be repositioned by the tractor 108, 110 at least partially beneath and/or in contact with the underside of a forward end portion 118 of the parked trailer 100. For example, a tractor 108, 110 (e.g., operatively coupled to the portable trailer stabilizer 200, 1200, 300, 1300, 2300) may be driven forward to position the portable trailer stabilizer 200, 1200, 300, 1300, 2300 at least partially beneath the forward end portion 118 of the parked trailer 100. If the portable trailer stabilizer 200, 1200 includes a fifth wheel plate 224, 1224 and the tractor 108, 110 includes a fifth wheel 112, 114 disposed on a rear portion of the tractor 108, 110, positioning the portable trailer stabilizer 200, 1200 may include driving the tractor 108, 110 in a rearward direction. If the portable trailer stabilizer 300 includes at least one conduit 324 and the tractor 110 includes at least one extended arm 120 disposed at a front end portion of the tractor 110, positioning the portable trailer stabilizer 300 may include driving the tractor 110 in a forward direction. If the portable trailer stabilizer 1300, 2300 includes at least one hook or trough 1324, or bar 2324 and the tractor 1110 includes at least one hook or trough 1324 disposed at a front end portion of the tractor 1110 or the tractor 2110 includes at least one hook 2120 disposed at a front end portion of the tractor 2110, positioning the portable trailer stabilizer 1300, 2300 may include driving the tractor 110 in a forward direction.

A vertical surface of the forward end portion 118 of the trailer 100 (and/or possibly the underneath surface of the trailer 100) may be contacted by the trailer engagement element (e.g., trailer engagement bar 204, 1204, 304 and/or sloped engagement surface 204A, 304A, 1240A) while the trailer engagement element is in a partial or fully extended configuration. While at least a portion of the portable trailer stabilizer 200, 1200, 300, 1300, 2300 is being positioned beneath the forward end portion 118 of the trailer 100, the trailer engagement element 204, 1204, 304 and/or sloped engagement surface 204A, 304A, 1240A may be pressed against a bottom edge of the vertical surface of the forward end portion 118 of the trailer 100, which may move the trailer engagement element from a partial or fully extended configuration to a lesser extended configuration that may include compressing the hydraulic cylinders 210, 1210, 310. Compressing the hydraulic cylinders 210, 1210, 310 may direct pressurized hydraulic fluid from the hydraulic cylinders 210, 1210, 310 to the hydraulic accumulator 214, 1214, 314 via the open isolation valves 216, 1216, 316, where the pressurized hydraulic fluid may be stored in the accumulator 214, 1214, 314.

While repositioning the stabilizer 200, 1200, 300, 1300, 2300 partially underneath the trailer 100, the support surface engagement elements (e.g., ground pad 202, 1202, 302) may be repositioned to contact the support surface 102. Contact between the ground pads 202, 1202, 302 and the support surface 102 may occur as the stabilizer is being repositioned horizontally or may occur after the horizontal position of the stabilizer is established. In either of the foregoing instances, at least a portion of the stabilizer 200, 1200, 300, 1300, 2300 may be vertically repositioned toward the support surface 102 to establish or at least increase the contact between grounds pads 202, 1202, 302 and the support surface. During this vertical repositioning (i.e., lowering) operation, the isolation valves 216, 1216, 316 may remain open, thereby allowing hydraulic fluid to flow between the accumulator 214, 1214, 314 and the hydraulic cylinders 210, 1210, 310. Accordingly, the trailer engagement element 204, 1204, 304 may remain in contact with an underside of the trailer 100 due to pressurized hydraulic fluid flowing from the accumulator 214, 1214, 314 to the hydraulic cylinders 210, 1210, 310 and extending the hydraulic cylinders 210, 1210, 310.

In this manner, when the hydraulic system is closed, pressurized, and the isolation valves 216, 1210, 316 are open, an equilibrium is established between the fluid within the hydraulic cylinders 210, 1210, 310 and the fluid within the accumulator 214, 1214, 314 (as well as the fluid flowing throughout the system). Prior to reaching this equilibrium, forces pushing down on the engagement element 204, 1204, 304 and/or sloped engagement surface 204A, 304A, 1240A may be operative to increase the hydraulic pressure within the hydraulic cylinders 210, 1210, 310 and, if this increased pressure is greater than that of the hydraulic pressure within the accumulator 214, 1214, 314, fluid will flow from the hydraulic cylinders 210, 1210, 310 and toward the accumulator 214, 1214, 314 until pressure within the system equilibrates, presuming the isolation valves 216, 1210, 316 are open. In this manner, active loads on the engagement element 204, 1204, 304 and/or sloped engagement surface 204A, 304A, 1240A may be operative to increase the hydraulic pressure within the system after equilibration. Conversely, if forces pushing down on the engagement element 204, 1204, 304 and/or sloped engagement surface 204A, 304A, 1240A are not operative to increase or maintain the hydraulic pressure within the hydraulic cylinders 210, 1210, 310 to a pressure at or above that of hydraulic fluid within the accumulator 214, 1214, 314, then fluid will flow from the accumulator 214, 1214, 314 toward the hydraulic cylinders 210, 1210, 310 (presuming the isolation valves 216, 1210, 316 are open), thus causing the hydraulic cylinders to extend or increase in length. In this manner, the absence of or lesser active loads on the engagement element 204, 1204, 304 and/or sloped engagement surface 204A, 304A, 1240A may be operative to decrease the hydraulic pressure within the system after equilibration. And when the pressure within the system reaches equilibrium again, the hydraulic pressure of the cylinders 210, 1210, 310 is approximately equal to the hydraulic pressure within the accumulator 214, 1214, 314, which maintains the position of the cylinders 210, 1210, 310 (i.e., no contraction or extension) presuming the isolation valves 216, 1210, 316 are open.

In exemplary application, when the hydraulic system is closed, pressurized, and the isolation valves 216, 1216, 316 are open, the hydraulic pressure of the system is operative to cause the hydraulic cylinders 210, 1210, 310 to extend to a maximum or near maximum length (unless otherwise governed). This maximum or near maximum length results in the trailer engagement element (e.g., trailer engagement bar 204, 1204, 304) being positioned at a maximum height or near maximum height (unless otherwise governed). In this fashion, as the stabilizer 200, 1200, 300, 1300, 2300 is positioned underneath the trailer 100, the trailer engagement element (e.g., trailer engagement bar 204, 1204, 304 and/or sloped engagement surface 204A, 304A, 1240A) may make contact with a portion of the trailer (such as the lower leading edge, a forward vertical surface, or a horizontal underneath surface) as the stabilizer is vertically and/or horizontally repositioned. In cases where the trailer engagement element (e.g., trailer engagement bar 204, 1204, 304 and/or sloped engagement surface 204A, 304A, 1240A) needs to have its vertical positioned lowered to fit underneath the trailer 100, the stabilizer 200, 1200, 300, 1300, 2300 may be wedged with respect to the trailer 100 so that the trailer exerts downward force on the trailer engagement element. Downward force on the trailer engagement element is resultantly transferred to the hydraulic cylinders 210, 1210, 310 and the pressure of the fluid therein. In this manner, the downward force on the trailer engagement bar 204, 1204, 304 and/or sloped engagement surface 204A, 304A, 1240A (exerted by the trailer 100) is operative to increase the hydraulic pressure and compress the hydraulic cylinders 210, 1210, 310 to lower the trailer engagement element and allow it to pass underneath the trailer, while the higher pressure fluid flows from the cylinders 210, 1210, 310 toward the accumulator 214, 1214, 314 as the isolation valves 216, 1216, 316 are open. But because the hydraulic system is pressurized, the fluid reaches equilibrium and the upward and downward forces acting on the trailer engagement element (e.g., trailer engagement bar 204, 1204, 304 and/or sloped engagement surface 204A, 304A, 1240A) are equalized with respect to the hydraulic pressure of the fluid within the accumulator 214, 1214, 314 to maintain contact between the underside of the trailer 100 and trailer engagement element. Upon reaching the final horizontal position of the stabilizer 200, 1200, 300, 1300, 2300, underneath the trailer 100, at least a portion of the stabilizer may be repositioned (i.e., vertically lowered) so that the support surface engagement elements (e.g., ground pad 202, 1202, 302) thoroughly contact the support surface 102. In circumstances where at least a portion of the stabilizer is vertically lowered so that the support surface engagement elements thoroughly contact the support surface, the trailer forces acting on the trailer engagement element effectively decrease during this vertical repositioning of the stabilizer 200, 1200, 300, 1300, 2300. As a result, the pressurized hydraulic fluid within the system would be the dominant force, thus causing the hydraulic cylinders 210, 1210, 310 to extend (i.e., increase in length) until reaching a maximum length or until the trailer engagement element contacts the undersurface of the trailer so that the downward trailer forces are sufficient to oppose further extension of the hydraulic cylinders 210, 1210, 310.

After at least a portion of the stabilizer 200, 1200, 300, 1300, 2300 is positioned appropriately (vertically, laterally, and horizontally) underneath a forward end 118 of the trailer 100, the tractor 108, 110 may disengage from the portable trailer stabilizer 200, 1200, 300, 1300, 2300. Disengagement between the tractor 108, 110 and the stabilizer 200, 1200, 300, 1300, 2300 may coincide with shutting the isolation valve 216, 1216, 316. More specifically, if the trailer stabilizer positioning element includes a fifth wheel 112, 114 and the positioning element engagement element includes a fifth wheel plate 224, 1224, disengaging the tractor 108, 110 from the portable trailer stabilizer 200, 1200 may include uncoupling the fifth wheel plate 224, 1224 of the portable trailer stabilizer from the fifth wheel 112, 114 of the tractor 108, 110. Disengaging the tractor 108, 110 from the portable trailer stabilizer 200, 1200 may include repositioning the valve operator element 220, 1220 to shut the isolation valve 216, 1216. If the trailer stabilizer positioning element includes an extended arm 120 and the positioning element engagement element includes a conduit 324 configured to receive the arm 120, disengaging the tractor 110 from the portable trailer stabilizer 300 may include disengaging the conduit 324 of the portable trailer stabilizer 300 from the arm 120 of the tractor 110. Disengaging the tractor 110 from the portable trailer stabilizer 300, 1300, 2300 may include moving the valve operator element 320, 1320, 2320 to shut the isolation valves 316. Post disengagement, the tractor 108, 110 (e.g., operatively decoupled from the portable trailer stabilizer 200, 1200, 300, 1300, 2300) may be repositioned to vacate a position immediately in front of the forward end portion 118 of the parked trailer 100. In cases where the tractor 108, 110 disengages from a portable trailer stabilizer 200, 1200, the tractor may be driven forward to finalize the tractor repositioning. Conversely, in cases where the tractor 108, 110 disengages from a portable trailer stabilizer 300, 1300, 2300, the tractor may be driven backwards to finalize the tractor repositioning.

As mentioned, when the stabilizer 200, 1200, 300, 1300, 2300 is in a stabilized position having at least a portion of the stabilizer underneath the forward end 118 of a parked trailer 100, the stabilizer may be operative to provide stabilization to the parked trailer during loading and/or unloading of material/goods/contents to or from the trailer. In one example, the stabilizer 200, 1200, 300, 1300, 2300 may be actively in contact with an underside of the trailer 100. In another example, the stabilizer 200, 1200, 300, 1300, 2300 may be spaced apart from the underside of the trailer 100. Both examples will be explained hereafter.

In an instance where the stabilizer 200, 1200, 300, 1300, 2300 is in a stabilization position that involves the stabilizer initially and thereafter being in contact with the underside of the trailer 100, the trailer engagement element (e.g., trailer engagement bar 204, 1204, 304) will most generally be the portion of the stabilizer contacting the trailer. For purposes of discussion, it may be presumed that the tractor 108, 110 is disengaged from the portable trailer stabilizer 200, 1200, 300, 1300, 2300 and that the isolation valve 216, 1216, 316 is closed, thereby discontinuing fluid communication between the hydraulic cylinders 210, 1210, 310 and the accumulator 214, 1214, 314. As a result, the hydraulic fluid within the hydraulic cylinders 210, 1210, 310 and conduits leading to the isolation valve 216, 1216, 316 is held within a fixed volume and the hydraulic fluid generally embodies an incompressible fluid.

In a case where material/goods/contents are loaded onto the trailer 100, particularly at the forward end portion 118 of the trailer 100, and the trailer engagement element contacts an underside of the trailer, the downward force imparted by the trailer 100 upon the stabilizer 200, 1200, 300, 1300, 2300 increases as more goods are loaded within the front of the trailer. This increase in downward force is ultimately borne by the hydraulic cylinders 210, 1210, 310 and operates to increase the pressure of the hydraulic fluid therein. But given that the hydraulic fluid is trapped, and is nearly incompressible, the increased hydraulic pressure does not lead to appreciable retraction of the hydraulic cylinders 210, 1210, 310 given that the hydraulic fluid is trapped in a fixed volume. As a result, even if the landing gear of the trailer 100 was to fail, the hydraulic cylinders 210, 1210, 310 are operative to support the entire weight of the forward end portion 118 of the trailer 100, thus avoiding roll-over or tip-over of the trailer 100 in an instance of landing gear partial or complete failure. A similar sequence applies to a trailer 100 unloaded with the stabilizer 200, 1200, 300, 1300, 2300 in a stabilized position.

Where material/goods/contents are unloaded from the trailer 100, particularly from the forward end portion 118 of the trailer 100, and the trailer engagement element contacts an underside of the trailer, the downward forces imparted by the trailer 100 upon the stabilizer 200, 1200, 300, 1300, 2300 decrease. This decrease in downward forces when the hydraulic cylinders 210, 1210, 310 are fully extended may lead to a vertical gap being created between the underside of the trailer 100 and the trailer engagement element (e.g., trailer engagement bar 204, 1204, 304) as sag associated with the trailer frame at the forward end portion 118 of the trailer is lessened. Conversely, a decrease in downward forces when the hydraulic cylinders 210, 1210, 310 are not fully extended may lead to no extension or a minimal extension of the hydraulic cylinders by lessening the downward forced applied to the stabilizer by the trailer while the hydraulic fluid continues to remain within a fixed volume as a result of the isolation valve 216, 1216, 316 being closed and inhibiting fluid communication between the hydraulic cylinders 210, 1210, 310 and the accumulator 214, 1214, 314. In either instance, however, the stabilizer 200, 1200, 300, 1300, 2300 maintains itself in a stabilizing position so that if the landing gear of the trailer 100 fails, the entire weight of the forward end portion of the trailer is able to be held up by the stabilizer. Those skilled in the art are aware of the dynamic forces imparted upon trailers by forklifts moving therein, as well as pumping fluids within on-board tanks of a semi-trailer, which can cause landing gear failure even when a trailer is being unloaded or is near empty. Consequently, stabilization of trailers is important in both loading and unloading operations.

Conversely, in an instance where the stabilizer 200, 1200, 300, 1300, 2300 is in a stabilization position that involves the stabilizer initially being spaced apart from the underside of the trailer 100, the trailer engagement element (e.g., trailer engagement bar 204, 1204, 304) will most generally be the portion of the stabilizer nearest to the underside of the trailer. For purposes of discussion, it may be presumed that the tractor 108, 110 is disengaged from the portable trailer stabilizer 200, 1200, 300 and that the isolation valve 216, 1216, 316 is closed, thereby discontinuing fluid communication between the hydraulic cylinders 210, 1210, 310 and the accumulator 214, 1214, 314. As a result, the hydraulic fluid within the hydraulic cylinders 210, 1210, 310 and conduits leading to the isolation valve 216, 1216, 316 is held within a fixed volume and the hydraulic fluid generally embodies an incompressible fluid.

In a case where material/goods/contents are loaded onto the trailer 100, particularly at the forward end portion 118 of the trailer 100, the downward forces imparted by the trailer increase. This increase in forces on the trailer 100 may result in the trailer sagging, which may or may not close the original spacing between the stabilizer 200, 1200, 300, 1300, 2300 and the underside of the trailer, which may result in contact between the stabilizer and the underside of the trailer 100. Contact by the trailer 100 onto the stabilizer 200, 1200, 300, 1300, 2300 results in some of the downward forces of the trailer being ultimately borne by the hydraulic cylinders 210, 1210, 310 and operates to increase the pressure of the hydraulic fluid therein. But given that the hydraulic fluid is trapped, and is nearly incompressible, the increased hydraulic pressure does not lead to appreciable retraction of the hydraulic cylinders 210, 1210, 310 given that the hydraulic fluid is trapped in a fixed volume. As a result, even if the landing gear of the trailer 100 was to fail, the hydraulic cylinders 210, 1210, 310 are operative to support the entire weight of the forward end portion 118 of the trailer 100, thus avoiding roll-over or tip-over of the trailer 100 in an instance of landing gear failure. Conversely, if a gap is maintained between the trailer 100 and the stabilizer 200, 1200, 300, 1300, 2300, and forces acting on the trailer cause the landing gear to fail, the underside of the trailer will immediately contact the trailer engagement element (e.g., trailer engagement bar 204, 1204, 304) in order to support the trailer. Given that the hydraulic fluid is trapped in a fixed volume, and is nearly incompressible, the increased hydraulic pressure that results on the hydraulic fluid trapped within the cylinders 210, 1210, 310 from the forward weight of the trailer being borne by the stabilizer does not lead to appreciable retraction of the hydraulic cylinders 210, 1210, 310. As a result, even if the landing gear of the trailer 100 fails, the hydraulic cylinders 210, 1210, 310 are operative to support the entire weight of the forward end portion 118 of the trailer 100, thus avoiding roll-over or tip-over of the trailer 100 in an instance of landing gear failure. A similar sequence applies to a trailer 100 unloaded with the stabilizer 200, 1200, 300, 1300, 2300 in a stabilized position.

In a circumstance where the stabilizer 200, 1200, 300, 1300, 2300 is positioned underneath the trailer 100 prior to the trailer being unloaded, and a gap exists between the underside of the trailer and the stabilizer, this gap will generally be maintained or slightly increased during unloading of material/goods/contents from the trailer 100. By way of example, particularly at the forward end portion 118 of the trailer 100, the downward forces imparted upon the trailer 100 decease as material is unloaded from the front of the trailer, which may result in a lesser sag associated with the trailer frame at the forward end portion 118 of the trailer. If this lessening of sag occurs, the spacing/gap between the stabilizer 200, 1200, 300, 1300, 2300 and the trailer may increase. Nevertheless, the spacing between the stabilizer 200, 1200, 300, 1300, 2300 and the trailer does not negate the stabilization provided if the landing gear of the trailer 100 fails during unloading. In a case of landing gear failure, the forward end portion 118 of the trailer 100 would be repositioned downward and negate any gap between the trailer and stabilizer, thereby coming to rest upon the trailer engagement element (e.g., trailer engagement bar 204, 1204, 304). Given that the hydraulic fluid is trapped in a fixed volume, and is nearly incompressible, the increased hydraulic pressure that results from the stabilizer bearing at least a portion of the weight of the trailer is trapped within the cylinders 210, 1210, 310 and does not lead to appreciable retraction of the hydraulic cylinders 210, 1210, 310. As a result, even if the landing gear of the trailer 100 fails, the hydraulic cylinders 210, 1210, 310 are operative to support the entire weight of the forward end portion 118 of the trailer 100, thus avoiding roll-over or tip-over of the trailer 100 in an instance of landing gear partial or complete failure.

Figure 22:
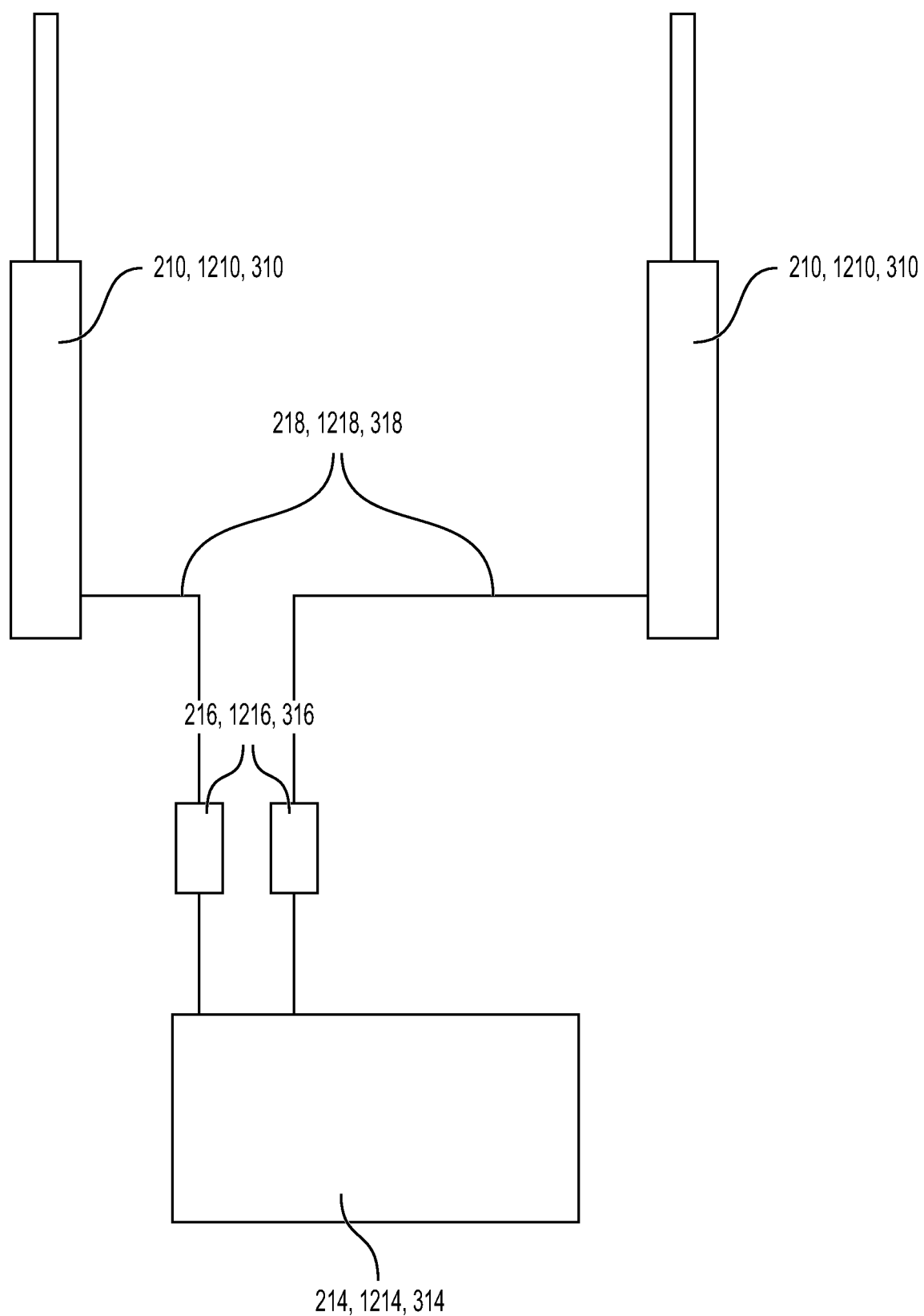
FIG. 22 is an exemplary diagram for a closed hydraulic system in accordance with the instant disclosure.

Turning to FIG. 22, a closed hydraulic system in accordance with the instant disclosure that may be used with any of the stabilizers 200, 1200, 300, 1300, 2300 may include a pair of hydraulic cylinders 210, 1210, 310 are in selective fluid communication with an accumulator 214, 1214, 314 via hydraulic lines 218, 1218, 318 and a pair of isolation valves 216, 1216, 316. As discussed herein, when the stabilizer 200, 1200, 300, 1300, 2300 is being repositioned from or to a stabilized position, the isolation valves 216, 1216, 316 may be open to allow fluid communication between the hydraulic cylinders 210, 1210, 310 and the accumulator 214, 1214, 314. But when the stabilizer is in a stabilized position, the isolation valves 216, 1216, 316 may be closed to discontinue fluid communication between the hydraulic cylinders 210, 1210, 310 and the accumulator 214, 1214, 314. Thus, when the stabilizer is in a stabilized position, the hydraulic fluid in the cylinders and downstream from the isolation valve in fluid communication with the cylinders occupies a fixed volume. In this manner, the stabilizer can hold up the load of the front portion of a trailer using a locked column or volume of fluid. Conversely, when the isolation valves 216, 1216, 316 are open to allow fluid communication between the hydraulic cylinders 210, 1210, 310 and the accumulator 214, 1214, 314, weight applied to the stabilizers 200, 1200, 300, 1300, 2300 results in increased pressure of the hydraulic fluid at the hydraulic cylinders 210, 1210, 310, which causes the cylinders to retract and fluid to flow from the cylinders, through the isolation valves, and into the accumulator 214, 1214, 314 until reaching an equilibrium. It should be noted that the accumulator 214, 1214, 314 comprises a variable volume chamber to accommodate different amounts of hydraulic fluid, while the chamber is pressurized to maintain at least a minimum pressure on the hydraulic fluid. As discussed herein, this minimum pressure may be sufficient to cause the hydraulic cylinders 210, 1210, 310 to fully extend or at least partially extend, rather than being fully retracted at a minimum length.

Figure 23:
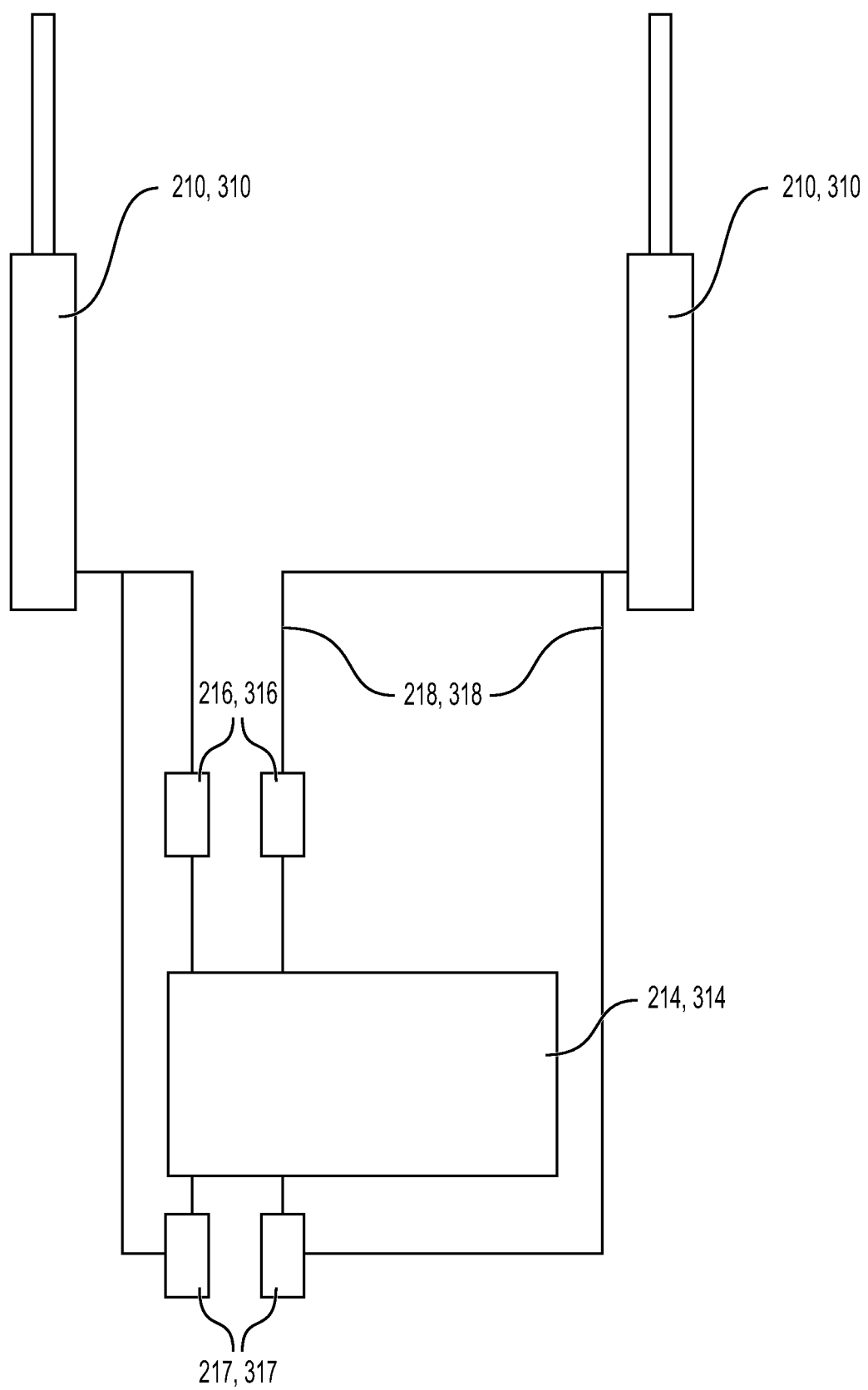
FIG. 23 is a further exemplary diagram for a closed hydraulic system in accordance with the instant disclosure.

Looking at FIG. 23, a further exemplary closed hydraulic system in accordance with the instant disclosure that may be used with any of the stabilizers 200, 1200, 300, 1300, 2300 may include a pair of hydraulic cylinders 210, 1210, 310 in selective fluid communication with an accumulator 214, 1214, 314 via hydraulic lines 218, 1218, 318, a pair of isolation valves 216, 1216, 316, and a pair of relief valves 217, 1217, 317. As discussed herein, when the stabilizer 200, 1200, 300, 1300, 2300 is being repositioned from or to a stabilized position, the isolation valves 216, 1216, 316 may be open to allow fluid communication between the hydraulic cylinders 210, 1210, 310 and the accumulator 214, 1214, 314. But when the stabilizer is in a stabilized position, the isolation valves 216, 1216, 316 may be closed to discontinue fluid communication between the hydraulic cylinders 210, 1210, 310 and the accumulator 214, 1214, 314 along a first path. Likewise, when the stabilizer is in a stabilized position, the relief valves 217, 1217, 317 may be closed to discontinue fluid communication between the hydraulic cylinders 210, 1210, 310 and the accumulator 214, 1214, 314 along a second path. Thus, when the stabilizer is in a stabilized position, the hydraulic fluid in the cylinders and downstream from the isolation valve in fluid communication with the cylinders occupies a fixed volume. In this manner, stabilizer can hold up the load of the front portion of a trailer using a locked column or volume of fluid until a pressure exerted by the hydraulic fluid reaches a predetermined pressure. This predetermined pressure may be the result of an abrupt landing gear failure or abrupt forces occurring as a result of loading/unloading of the trailer, thereby amplifying the force exerted upon the stabilizer (resulting from the dynamic forces being greater than the static forces), and causing an abrupt spike in the hydraulic fluid pressure within the cylinders. Upon reaching the predetermined relief pressure, which may result from the forward portion of the trailer 100 crashing downward onto the trailer engagement element (e.g., trailer engagement bar 204, 1204, 304), the relief valves 217, 1217, 317 may automatically open to bleed off hydraulic pressure from the cylinders and to the accumulator 214, 1214, 314 via the second path. In such a case, the bleeding action of the hydraulic fluid from the cylinders 210, 1210, 310 causes the cylinders to gradually retract until reaching a minimum length or until the hydraulic fluid within the cylinders is below the predetermined relief pressure—whichever occurs first. In either circumstance, the result may include the trailer stabilizer 200, 1200, 300, 1300, 2300 continuing to function as a support or functioning anew as a support with the stabilizer being in contact with the trailer. Accordingly, the stabilizer 200, 1200, 300, 1300, 2300 operates to dampen the descent of the forward portion of the trailer 100 in cases of landing gear partial or total failure or dynamic forces tending to sag the trailer from loading/unloading of materials. Conversely, when the isolation valves 216, 1216, 316 are open to allow fluid communication between the hydraulic cylinders 210, 1210, 310 and the accumulator 214, 1214, 314, such as when the stabilizer is being repositioned, hydraulic fluid pressure between the hydraulic cylinders 210, 1210, 310 and the accumulator 214, 1214, 314 along the first path may be equalized and correspondingly vary the length of the cylinders depending upon forced applied to the cylinders to counteract the hydraulic fluid pressure.

Figure 24:
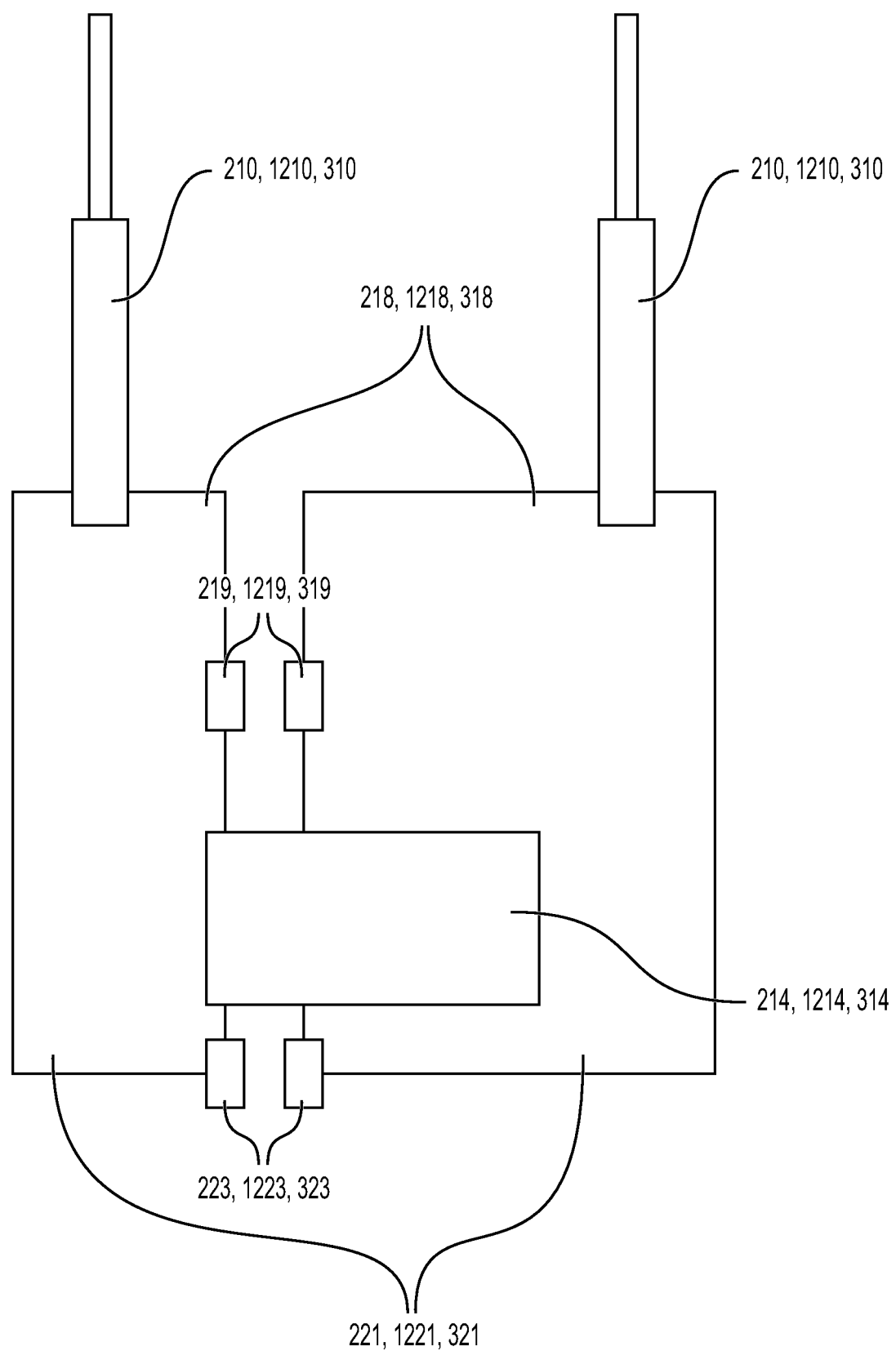
FIG. 24 is still a further exemplary diagram for a closed hydraulic system in accordance with the instant disclosure.

With reference to FIG. 24, a still further exemplary closed hydraulic system in accordance with the instant disclosure that may be used with any of the stabilizers 200, 1200, 300, 1300, 2300 may include a pair of hydraulic cylinders 210, 310 are in selective fluid communication along a first path with an accumulator 214, 1214, 314 via hydraulic lines 218, 1218, 318 and a pair of one-way valves 219, 1219, 319. These same hydraulic cylinders 210, 1210, 310 are in selective fluid communication along a second path with the accumulator 214, 1214, 314 via hydraulic lines 221, 1221, 321 and a second set of valves 223, 1223, 323. When the stabilizer 200, 1200, 300, 1300, 2300 is being repositioned from or to a stabilized position, the one-way valves 219, 1219, 319 allow fluid communication between the hydraulic cylinders 210, 1210, 310 and the accumulator 214, 1214, 314 such that higher pressure fluid in the accumulator is able to flow to the cylinders via the hydraulic lines 218, 1218, 318, but higher pressure fluid in the cylinders is precluded from flowing through the one-way valves via the hydraulic lines 218, 1218, 318 to the accumulator. When the stabilizer is in a stabilized position, the one-way valves 219, 1219, 319 remain able to be opened when the hydraulic pressure within the accumulator 214, 1214, 314 is higher than the hydraulic pressure within the cylinders 210, 1210, 310. Similarly, the set of valves 223, 1223, 323 are normally closed when the stabilizer 200, 1200, 300, 1300, 2300 is being repositioned from or to a stabilized position, as well as when the stabilizer is in a stabilized position. When the release valves 223, 1223, 323 are closed, fluid communication between the cylinders 210, 1210, 310 and the accumulator 214, 1214, 314 is precluded within the hydraulic lines 221, 1221, 321.

When the stabilizer 200, 1200, 300, 1300, 2300 is in a stabilized position, the hydraulic fluid in the cylinders 210, 1210, 310 and downstream from the one-way valves 219, 1219, 319 occupies a fixed volume. In this manner, stabilizer can hold up the load of the front portion of a trailer using a locked column of fluid as the downward force exerted by the trailer on the stabilizer 200, 1200, 300, 1300, 2300 increases, without appreciable compression of the overall height of the stabilizer, because the one-way valves 219, 1219, 319 inhibit higher pressure fluid from traveling to the accumulator 214, 1214, 314. Conversely, in cases where the downward force on the front of the trailer is reduced, such as when material is unloaded from the trailer, sag associated with the trailer may decrease, thereby causing the underneath surface of the trailer to rise. This increase in height of the underside of the trailer may create a gap between the stabilizer 200, 1200, 300, 1300, 2300 and the underneath surface of the trailer. Unlike the prior exemplary diagrams, the instant configuration allows the stabilizer 200, 1200, 300, 1300, 2300 to automatically react to increases in height of the underside of the trailer, post location in a stabilization position. In particular, as the downward force applied to the stabilizer 200, 1200, 300, 1300, 2300 by the trailer decreases or is eliminated (e.g., resulting from unloading of materials from the trailer), the pressure of the hydraulic fluid within the cylinders decreases, which means that the hydraulic fluid pressure on the accumulator 214, 1214, 314 side of the one-way valves 219, 1219, 319 is greater than the hydraulic fluid pressure on the cylinder side of the one-way valves 219, 1219, 319. This pressure differential allows the one-way valves 219, 1219, 319 to open and push additional hydraulic fluid into the cylinders 210, 1210, 310, which causes the cylinders to extend until reaching a maximum extension or until contacting the undersurface of the trailer and reaching an equilibrium between the downward force of the trailer and the hydraulic fluid pressure. In this manner, the stabilizer 200, 1200, 300, 1300, 2300 is able to actively react to decreases in downward pressure coming from the trailer to reduce or eliminate any gap between the stabilizer and the underside of the trailer.

Similarly, when the stabilizer 200, 1200, 300, 1300, 2300 is in a stabilized position, the hydraulic fluid in the cylinders 210, 1210, 310 and upstream from the release valves 223, 1223, 323 occupies a fixed volume. In this manner, stabilizer can hold up the load of the front portion of a trailer using a locked column of fluid as the downward force exerted by the trailer on the stabilizer 200, 1200, 300, 1300, 2300 increases, without appreciable compression of the overall height of the stabilizer. In a circumstance where the release valves 223, 1223, 323 are relief valves, the valves will maintain a fixed volume until the hydraulic pressure exceeds a predetermined threshold pressure, which when reached allows the valves to open and release the higher pressure hydraulic fluid to the accumulator 214, 1214, 314. Moreover, the relief valves may have a manual override that allows the valves to open when the stabilizer is 200, 1200, 300, 1300, 2300 engaged by a tractor 108, 110 for repositioning of the stabilizer. Alternatively, the release valves 223, 1223, 323 may comprise any type of valve that allows selective communication between the cylinders 210, 1210, 310 and the accumulator 214, 1214, 314, such as, without limitation, isolation valves that are opened upon engaged by a tractor 108, 110 for repositioning of the stabilizer. In this fashion, higher pressure fluid within the cylinders 210, 1210, 310 may be routed to the accumulator 214, 1214, 314 via manual control over the valves 223, 1223, 323 or automatic opening of the valves when the stabilizer is 200, 1200, 300, 1300, 2300 engaged by a tractor 108, 110 for repositioning of the stabilizer.

Returning to FIGS. 1-20, when it is desired to discontinue use of the portable trailer stabilizer 200, 1200, 300 with the trailer 100 (e.g., when the trailer 100 no longer requires stabilization), the portable trailer stabilizer 200, 1200, 300 may be moved from at least partially beneath and/or in contact with the forward end portion 118 of the trailer 100 to a different location. Some example methods of moving a portable trailer stabilizer 200, 1200, 300 may include coupling a tractor 108, 110 to a portable trailer stabilizer 200, 1200, 300, which may be positioned at least partially beneath and/or in contact with a forward end portion 118 of a parked trailer 100. Coupling the tractor 108, 110 to the portable trailer stabilizer 200, 1200, 300 may be operative to open the isolation valves 216, 1216, 316, such as by moving the valve operator element 220, 1220, 320. Coupling the tractor 108, 110 to the portable trailer stabilizer 200, 1200, 300 may include coupling a trailer stabilizer positioning element (e.g., fifth wheel 112, 114 and/or trailer stabilizer positioning element 116) of the tractor 108, 110 to a positioning element engagement element (e.g., fifth wheel plate 224, 1224 and/or conduits 324) of the portable trailer stabilizer 200, 1200, 300.

If the trailer stabilizer positioning element includes a fifth wheel 112, 114 and the positioning element engagement element includes a fifth wheel plate 224, 1224, coupling the tractor 108, 110 to the portable trailer stabilizer 200, 1200 may include coupling the fifth wheel plate 224, 1224 of the portable trailer stabilizer 200, 1200 to the fifth wheel 112, 114 of the tractor 108, 110. Coupling the tractor 108, 110 to the portable trailer stabilizer 200, 1200 may include pivoting the valve operator element 220, 1220 to open the isolation valves 216, 1216. If the portable trailer stabilizer 200, 1200 includes a fifth wheel plate 224, 1224 and the tractor 108, 110 includes a fifth wheel 112, 114 disposed on a rear portion of the tractor 108, 110, coupling the tractor 108, 110 to the portable trailer stabilizer 200, 1200 may include driving the tractor 108, 110 in a rearward direction.

If the trailer stabilizer positioning element includes an extended arm 120 and the positioning element engagement element includes a channel 324 configured to receive the arm 120, coupling the tractor 110 to the portable trailer stabilizer 300 may include engaging the at least one channel 324 of the portable trailer stabilizer 300 with the at least one arm 120 of the tractor 110. Coupling the tractor 110 to the portable trailer stabilizer 300 may include moving the valve operator element 320 to open the isolation valve 316. If the portable trailer stabilizer 300 includes at least one channel 324 and the tractor 110 includes at least one extended arm 120 disposed at a front end portion of the tractor 110, coupling the tractor 110 to the portable trailer stabilizer 300 may include driving the tractor 110 in a forward direction.

In some example embodiments, the support surface engagement element (e.g., ground pad 202, 1202, 302) may be raised above the support surface 102, which may include pressing the trailer engagement element (e.g., trailer engagement bar 204, 1204, 304) against the forward end portion 118 of the trailer 100 and/or compressing the hydraulic cylinders 210, 1210, 310. Compressing the hydraulic cylinders 210, 1210, 310 may direct pressurized hydraulic fluid to the hydraulic accumulator 214, 1214, 314 via the open isolation valves 216, 1216, 316. The pressurized hydraulic fluid may be stored in the accumulator 214, 1214, 314. The portable trailer stabilizer 200, 1200, 300 may be moved away from the trailer 100 using the tractor 108, 110.

In some example embodiments, as the portable trailer stabilizer 200, 1200, 300 moves away from the forward end portion 118 of the trailer 100, the trailer engagement element (e.g., trailer engagement bar 204, 1204, 304) may move out from beneath the forward end portion 118 of the trailer 100. When the trailer engagement element is no longer in contact with the trailer 100, pressurized hydraulic fluid from the hydraulic accumulator 214, 1214, 314 may flow through the open isolation valves 216, 1216, 316 to the hydraulic cylinders 210, 310, which may extend the hydraulic cylinders 210, 1210, 310. Extending the hydraulic cylinders 210, 1210, 310 may extend the trailer engagement element relative to the support surface engagement element, such as to the fully extended configuration.

Tractors 1110, 2110 comprising upwardly facing hooks 1120 and hooks 2120, and portable trailer stabilizers 1300, 2300 comprising corresponding downwardly facing channels 1324 and bars 2324, respectively, may be operated in generally the same manner as described above with reference to tractors 110 having extended arms 120 and portable trailer stabilizers 300 have corresponding conduits 324. Repeated description is omitted for brevity.

Generally, in some example portable trailer stabilizers comprising hydraulically operated components, the hydraulic fluid may comprise any fluid suitable for use as a medium for hydraulically transferring power. Some such fluids may be substantially incompressible under expected operating conditions. For example, the hydraulic fluid may include one or more of water, propylene glycol, a petroleum-based oil, and/or a synthetic oil.

Some example portable trailer stabilizers according to at least some aspects of the present disclosure may include location reporting devices. For example, a portable trailer stabilizer may be provided with a satellite navigation system (e.g., Global Positioning System (GPS)) unit configured to transmit its location via a wireless network, such as a local area network, a cellular network, and/or a satellite communications network.

The present disclosure contemplates that some known trailer stabilizers may require an operator, such as a terminal tractor driver, to manually operate various components of a trailer stabilizer. For example, the individual may operate jacks or other mechanisms associated with the trailer stabilizer while outside of the terminal tractor and on the ground adjacent to the trailer stabilizer. Some example embodiments according to at least some aspects of the present disclosure may allow a terminal tractor driver to position or remove a portable trailer stabilizer while remaining on the terminal tractor. Accordingly, in some circumstances, some portable trailer stabilizers according to at least some aspects of the present disclosure may improve safety and/or efficiency of freight terminal operations involving parked semi-trailers.

Some example embodiments according to at least some aspects of the present disclosure may include trailer restraint and/or retention features, which may be configured to prevent movement of a parked semi-trailer. For example, restraint and/or retention features may be configured to couple to the king pin of a semi-trailer and/or to couple to a ground cleat (e.g., anchor) secured on the support surface. Some example restraint and/or retention features which may be used in connection with various embodiments according to the present disclosure are disclosed in U.S. Pat. No. 9,656,637 and U.S. Patent Application Publication No. 2021/0048141, each of which is incorporated by reference in its entirety.

Example methods of manufacturing apparatus according to at least some aspects of the present disclosure and components thereof may include operations associated with acquiring, producing, and assembling various parts, elements, components, and systems described herein.

Unless specifically indicated, it will be understood that the description of any structure, function, and/or methodology with respect to any illustrative embodiment herein may apply to any other illustrative embodiments. More generally, it is within the scope of the present disclosure to utilize any one or more features of any one or more example embodiments described herein in connection with any other one or more features of any other one or more other example embodiments described herein. Accordingly, any combination of any of the features or embodiments described herein is within the scope of this disclosure.

Following from the above description and invention summaries, it should be apparent to those of ordinary skill in the art that, while the methods and apparatuses herein described constitute example embodiments according to the present disclosure, it is to be understood that the scope of the disclosure contained herein is not limited to the above precise embodiments and that changes may be made without departing from the scope of the disclosure. Likewise, it is to be understood that it is not necessary to meet any or all of the identified advantages or objects disclosed herein in order to fall within the scope of the disclosure, since inherent and/or unforeseen advantages may exist even though they may not have been explicitly discussed herein.

What is claimed is:

1. A method of stabilizing a semi-trailer parked adjacent a loading dock bay, the method comprising:
   driving a tractor, operatively coupled to a portable trailer stabilizer, forward to position the portable trailer stabilizer at least partially beneath a forward end portion of a semi-trailer that is parked adjacent a loading dock bay;
   operatively decoupling the portable trailer stabilizer from the tractor and retaining the portable trailer stabilizer at least partially beneath the forward end portion of the semi-trailer that is parked, the portable trailer stabilizer configured to remain stationary once operatively decoupled from the tractor; and
   driving the tractor, operatively decoupled from the portable trailer stabilizer, rearward to vacate a position immediately in front of the forward end portion of the semi-trailer while parked.

2. The method of claim 1, further comprising:
   driving the tractor, while operatively coupled to the semi-trailer, rearward to reposition the semi-trailer at a loading dock door, where upon termination of repositioning of the semi-trailer results in the semi-trailer being parked;
   operatively decoupling the semi-trailer from the tractor to retain the semi-trailer in a parked position; and
   driving the tractor, while operatively decoupled from the semi-trailer, forward to vacate the position immediately in front of the forward end portion of the semi-trailer while parked.

3. The method of claim 2, further comprising: turning the tractor around so that a forward portion of the tractor faces the forward end portion of the semi-trailer while parked prior to positioning the portable trailer stabilizer at least partially beneath the forward end portion of the semi-trailer while parked.

4. A method of stabilizing a parked semi-trailer adjacent a loading dock bay, the method comprising:

repositioning a tractor, with a lift extending forward of a front of the tractor, the lift operatively coupled to a portable trailer stabilizer while at least a portion of the portable trailer stabilizer is elevated above the ground, forward to position the portable trailer stabilizer proximate a forward end of a semi-trailer that is parked adjacent a loading dock bay;

repositioning the tractor forward to reposition the portable trailer stabilizer at least partially beneath the forward end of the semi-trailer;

repositioning the lift located at the front of the tractor in order to lower the portion of the portable trailer stabilizer to be in contact with the ground when proximate the forward end of the semi-trailer that is parked;

operatively decoupling the portable trailer stabilizer from the lift after the portion of the portable trailer stabilizer is in contact with the ground; and, reversing the tractor, after the lift is operatively decoupled from portable trailer stabilizer, to vacate a position in front of the forward end of the semi-trailer while parked.

5. The method of claim 4, further comprising, subsequent to positioning the portable trailer stabilizer proximate the forward end of the semi-trailer:

repositioning the tractor forward, after contents of the semi-trailer have been at least one of loaded and unloaded, proximate the portable trailer stabilizer, while the portion of the portable trailer stabilizer contacts the ground;

repositioning the tractor rearward, while the tractor is operatively coupled to the portable trailer stabilizer to remove the portable trailer stabilizer from underneath the forward end of the semi-trailer;

repositioning the lift, operatively coupled to the portable trailer stabilizer, to raise the portion of the portable trailer stabilizer to be elevated above the ground; and, repositioning the tractor rearward, while the portion of the portable trailer stabilizer is elevated above the ground, to remove the portable trailer stabilizer from a front of the semi-trailer.

6. The method of claim 4, further comprising, prior to positioning the portable trailer stabilizer proximate the forward end of the semi-trailer:

repositioning the tractor, while operatively coupled to the semi-trailer and before contents thereof are at least one of loaded and unloaded, rearward to reposition the semi-trailer at a loading dock door resulting in the semi-trailer being parked;

operatively decoupling the semi-trailer from the tractor and retaining the semi-trailer in a parked position; and repositioning the tractor, while operatively decoupled from the semi-trailer, forward to vacate a position beneath the forward end of the semi-trailer while parked.

7. The method of claim 4, wherein:
a rear of the tractor includes a fifth wheel; and,
the lift is located directly in front of the tractor.

8. The method of claim 7, wherein an operator cab of the tractor interposes the fifth wheel and the lift.

9. The method of claim 4, wherein the lift operatively couples to the portable trailer stabilizer using a bar and hook arrangement.

10. The method of claim 4, wherein:
the portable trailer stabilizer includes a first ground pad laterally spaced from a second ground pad; and the first and second ground pads are configured to contact the ground when the portable trailer stabilizer is stationary.

11. The method of claim 6, further comprising, after repositioning the tractor forward to vacate the position beneath the forward end of the semi-trailer while parked:

locating the portable trailer stabilizer sitting on the ground in an unused state;

repositioning the tractor forward in proximity to the portable trailer stabilizer in the unused state;

repositioning the lift to operatively couple the tractor to the portable trailer stabilizer and elevating at least the portion of the portable trailer stabilizer off the ground;

repositioning the tractor, while at least the portion of the portable trailer stabilizer is elevated off the ground, in route to the semi-trailer.

12. The method of claim 5, further comprising, after removing the portable trailer stabilizer from the front of the semi-trailer:

repositioning the tractor, while the lift is operatively coupled to the portable trailer stabilizer and while at least the portion of the portable trailer stabilizer is elevated above the ground, forward to position the portable trailer stabilizer proximate a forward end of a second semi-trailer that is parked;

repositioning the tractor forward to reposition the portable trailer stabilizer at least partially beneath the forward end of the second semi-trailer;

repositioning the lift located at the front of the tractor in order to lower the portion of the portable trailer stabilizer to be in contact with the ground when proximate the forward end of the second semi-trailer that is parked;

operatively decoupling the portable trailer stabilizer from the lift after the portable trailer stabilizer is in contact with the ground; and, reversing the tractor, after the lift is operatively decoupled from portable trailer stabilizer, to vacate a position in front of the forward end of the second semi-trailer while parked.

13. The method of claim 4, wherein operatively decoupling the portable trailer stabilizer from the lift includes vertically lowering a portion of the lift received within a fixed position, U-shaped receiver of the portable trailer stabilizer.

14. The method of claim 4, further comprising visually verifying by an operator of the tractor that the portable trailer stabilizer is at least partially beneath the forward end of the semi-trailer before operatively decoupling the portable trailer stabilizer from the lift.

15. The method of claim 4, wherein positioning the portable trailer stabilizer proximate the forward end of the semi-trailer includes having the portable trailer stabilizer completely off the ground.

16. A method of stabilizing a parked semi-trailer parked adjacent a loading dock bay, the method comprising:

repositioning a tractor forward, carrying a ground pad of a portable trailer stabilizer elevated above the ground, to arrive proximate a forward end portion of a parked semi-trailer;

repositioning a lift associated with the tractor to reposition the ground pad into contact with the ground;

repositioning the tractor forward to reposition the portable trailer stabilizer at least partially underneath the forward end portion of the parked semi-trailer;

operatively decoupling the portable trailer stabilizer from the tractor;

repositioning the tractor rearward, no longer carrying the ground pad of the portable trailer stabilizer elevated above the ground; and retaining the portable trailer stabilizer at least partially underneath the forward end portion of the parked semi-trailer as material is at least one of unloaded from the parked semi-trailer and loaded on the parked semi-trailer.

17. The method of claim 16, wherein after the material is at least one of unloaded from the parked semi-trailer and loaded on the parked semi-trailer, the method further includes:

repositioning the tractor forward to operatively couple a front of the tractor with the portable trailer stabilizer;

repositioning the tractor rearward to reposition the portable trailer stabilizer from occupying a position at least partially underneath the forward end portion of the parked semi-trailer;

repositioning the lift associated with the tractor to reposition the ground pad elevated above the ground;

repositioning the tractor forward, carrying the ground pad of the portable trailer stabilizer elevated above the ground, to arrive at another location displaced from the forward end portion of the parked semi-trailer.

18. The method of claim 16, wherein operatively decoupling the portable trailer stabilizer from the tractor includes disengaging a lifting connection between a bar and multiple hooks associated with the tractor and the portable trailer stabilizer.

19. A method of stabilizing a parked semi-trailer, the method comprising:

positioning a portable trailer stabilizer at least partially beneath a forward end of a parked semi-trailer before material is at least one of unloaded from the parked semi-trailer and loaded on the parked semi-trailer;

repositioning a tractor forward, after material is at least one of unloaded from the parked semi-trailer and loaded on the parked semi-trailer, and lifting at least a portion of the portable trailer stabilizer off the ground;

repositioning the tractor rearward, while lifting at least the portion of the portable trailer stabilizer off the ground, to remove the portable trailer stabilizer from beneath the forward end of the parked semi-trailer.

20. The method of claim 19, wherein positioning the portable trailer stabilizer at least partially beneath the forward end of the parked semi-trailer includes:

using a lift located at a front of the tractor to elevate at least the portion of the portable trailer stabilizer off the ground for transport to a location proximate the parked semi-trailer; and, using the lift to lower at least the portion of the portable trailer stabilizer into contact with the ground when at the location proximate the parked semi-trailer.

21. The method of claim 19, further comprising:

disengaging the tractor from the portable trailer stabilizer after positioning the portable trailer stabilizer at least partially underneath the forward end the parked semi-trailer and before material is at least one of unloaded from the parked semi-trailer and loaded on the parked semi-trailer;

wherein disengaging the tractor from the portable trailer stabilizer includes using a lift located at a front of the tractor to lower at least the portion of the portable trailer stabilizer from an elevated position above the ground to a ground contacting position.

* * * * *